US011348016B2

(12) United States Patent
Cormier et al.

(10) Patent No.: US 11,348,016 B2
(45) Date of Patent: May 31, 2022

(54) COGNITIVE MODELING APPARATUS FOR ASSESSING VALUES QUALITATIVELY ACROSS A MULTIPLE DIMENSION TERRAIN

(71) Applicant: Scianta Analytics, LLC, Delaray Beach, FL (US)

(72) Inventors: Michael E. Cormier, Delray Beach, FL (US); Earl D. Cox, Delray Beach, FL (US); William E. Thackrey, Delray Beach, FL (US); Joseph McGlynn, Delray Beach, FL (US); Harry Gardner, Delray Beach, FL (US)

(73) Assignee: Scianta Analytics, LLC, Delray Beach, FL (US)

( * ) Notice: Subject to any disclaimer, the term of this patent is extended or adjusted under 35 U.S.C. 154(b) by 988 days.

(21) Appl. No.: 15/707,859

(22) Filed: Sep. 18, 2017

(65) Prior Publication Data
US 2018/0082189 A1    Mar. 22, 2018

Related U.S. Application Data

(60) Provisional application No. 62/467,414, filed on Mar. 6, 2017, provisional application No. 62/239,666, filed on Sep. 21, 2016.

(51) Int. Cl.
*G06N 5/02*    (2006.01)
*G06N 20/00*    (2019.01)
(Continued)

(52) U.S. Cl.
CPC ......... *G06N 5/022* (2013.01); *G06F 21/6218* (2013.01); *G06N 7/005* (2013.01); *G06N 20/00* (2019.01)

(58) Field of Classification Search
CPC ........ G06N 5/022; G06N 20/00; G06N 7/005; G06F 21/6218
See application file for complete search history.

(56) References Cited

U.S. PATENT DOCUMENTS

| 7,933,989 B1 | 4/2011 | Barker |
| 2010/0138272 A1 | 6/2010 | Rackham |

(Continued)

FOREIGN PATENT DOCUMENTS

| CN | 105704736 | 6/2016 |
| DE | 10257473 | 7/2004 |

OTHER PUBLICATIONS

Kim et al, Anomaly Detection in Multiple Scales for Insider Threat Analysis (Year: 2011).*
(Continued)

*Primary Examiner* — Eric Nilsson
(74) *Attorney, Agent, or Firm* — Smyrski Law Group, A.P.C.

(57) ABSTRACT

The present design is directed to a system for measuring values qualitatively across a terrain including multiple dimensions using cognitive computing techniques, comprising a plurality of event reception components configured to operate on each event in a stream relevant to the terrain, the plurality of event reception components including a threshold application component configured to apply a threshold to each element in the stream, a terrain updater configured to update the terrain based on at least one event, an outlier analysis module configured to determine any outlier in the stream of events, a threshold violation predictor configured to predict threshold violations based on the stream of events, a time-ordered behavior evaluator configured to evaluate behavior based on the stream of events, and a graph updater to update a graph based on the stream of events.

20 Claims, 7 Drawing Sheets

(51) Int. Cl.
    *G06F 21/62*     (2013.01)
    *G06N 7/00*      (2006.01)

(56) References Cited

U.S. PATENT DOCUMENTS

| | | | | |
|---|---|---|---|---|
| 2012/0137367 | A1* | 5/2012 | Dupont | G06F 21/00 |
| | | | | 726/25 |
| 2014/0108321 | A1 | 4/2014 | Buchanan et al. | |
| 2015/0355957 | A1* | 12/2015 | Steiner | G06F 11/079 |
| | | | | 714/37 |
| 2016/0071017 | A1* | 3/2016 | Adjaoute | G06N 20/00 |
| | | | | 706/52 |
| 2017/0249648 | A1* | 8/2017 | Garvey | G06F 21/55 |

OTHER PUBLICATIONS

Mayhew et al, Use of Machine Learning in Big Data Analytics for Insider Threat Detection (Year: 2015).*

Rasheed, Faraz, and Reda Alhajj. "A framework for periodic outlier pattern detection in time-series sequences." IEEE transactions on cybernetics 44.5 (2013): 569-582. (Year: 2013).*

* cited by examiner

COGNITIVE MODELING APPARATUS FOR ASSESSING VALUES QUALITATIVELY ACROSS A MULTIPLE DIMENSION TERRAIN

The present application claims the benefit of U.S. Provisional Patent Application Ser. No. 62/397,866, filed Sep. 21, 2016, inventors Michael E. Cormier et al., entitled "Apparatus and Process for Analyzing and Categorizing the Behavior of Actors in an Environment," and further claims the benefit of U.S. Provisional Patent Application Ser. No. 62/467,414, filed Mar. 6, 2017, inventors Michael E. Cormier et al., entitled "Cognitive Modeling Apparatus and Method Including Compute Servers, Statistical Modeling, and Relevancy Engine," the entirety of both of which are incorporated herein by reference.

BACKGROUND OF THE INVENTION

Field of the Invention

The present invention relates generally to the field of computing systems, and more specifically to computing systems employing cognitive modeling.

Description of the Related Art

Humans typically think about physical behavior using qualitative concepts, such as "risky" or "dangerous," instead of a precise numerical value, such as "there's a 67% chance X will kill you." As a consequence, when processing data, most humans are typically interested in identifying data items that satisfy qualitative criteria. For example, an analyst may want to identify people sending an "unusual amount of email" as opposed to "more than 10 emails." In existing analysis systems, an analyst is typically unable to translate qualitative behavior criteria into corresponding numerical values before performing an analysis. This process, if it exists at all, is both time-consuming and problematic because the numerical values for specific qualitative behavior criteria can vary considerably among different contexts. For example, the definition of an "unusual number of failed logins" by a computer user is likely to be different during a peak-usage time in the middle of the day in comparison to a low-usage time in the middle of the night. Also, the definition of a specific qualitative behavior criterion can vary among different users and different contexts.

While such systems can have benefits, one drawback is the inability to change attributes or criteria dynamically. For example, while a "short response time" may have a given connotation in one set of circumstances at a particular time within a system, the same system may warrant a different set of parameters when circumstances change. The question is how can the system change or adapt depending on the parameters of interest, and more particularly, how can such machines be extended, tuned, and deployed.

A further issue with available designs is the ability to process and operate on large amounts of data, such as data that appears to be relatively infinite. It can also be difficult to scale the performance of multiple disjoint algorithms across an actor population, particularly when such an actor population is exceedingly large or apparently infinite.

It would therefore be advantageous to provide a system that overcomes the issues with current modeling and reasoning devices and enables dynamic assessment and alteration of system related parameters based on changed circumstances encountered, particularly when exceedingly large and/or apparently infinite amounts of information are considered.

SUMMARY OF THE INVENTION

Thus according to one aspect of the present design, there is provided a system for measuring values qualitatively across a terrain comprising multiple dimensions using cognitive computing techniques, comprising a plurality of event reception components configured to operate on each event in a stream relevant to the terrain, the plurality of event reception components comprising a threshold application component configured to apply a threshold to each element in the stream, a terrain updater configured to update the terrain based on at least one event, an outlier analysis module configured to determine any outlier in the stream of events, a threshold violation predictor configured to predict threshold violations based on the stream of events, a time-ordered behavior evaluator configured to evaluate behavior based on the stream of events, and a graph updater to update a graph based on the stream of events.

According to a further aspect of the present design, there is provided a system for measuring values qualitatively across a terrain comprising multiple dimensions using cognitive computing techniques, comprising a plurality of event reception components configured to operate on each event in a stream relevant to the terrain, a periodic set of components configured to operate periodically on demand to analyze and predict based on information received from the plurality of event reception components, and a plurality of signal managers interfacing with the plurality of event reception components and the periodic set of components, wherein the plurality of signal managers is configured to exclude signals based on content properties of data transmitted.

According to a further aspect of the present design, there is provided a method for measuring values qualitatively across a terrain comprising multiple dimensions using cognitive computing techniques, comprising operating on each event in a stream relevant to the terrain using a plurality of event reception components, operating on demand to analyze and predict based on information received from the plurality of event reception components using a periodic set of components, and excluding selected signals based on content properties of data transmitted.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

Figure 1:
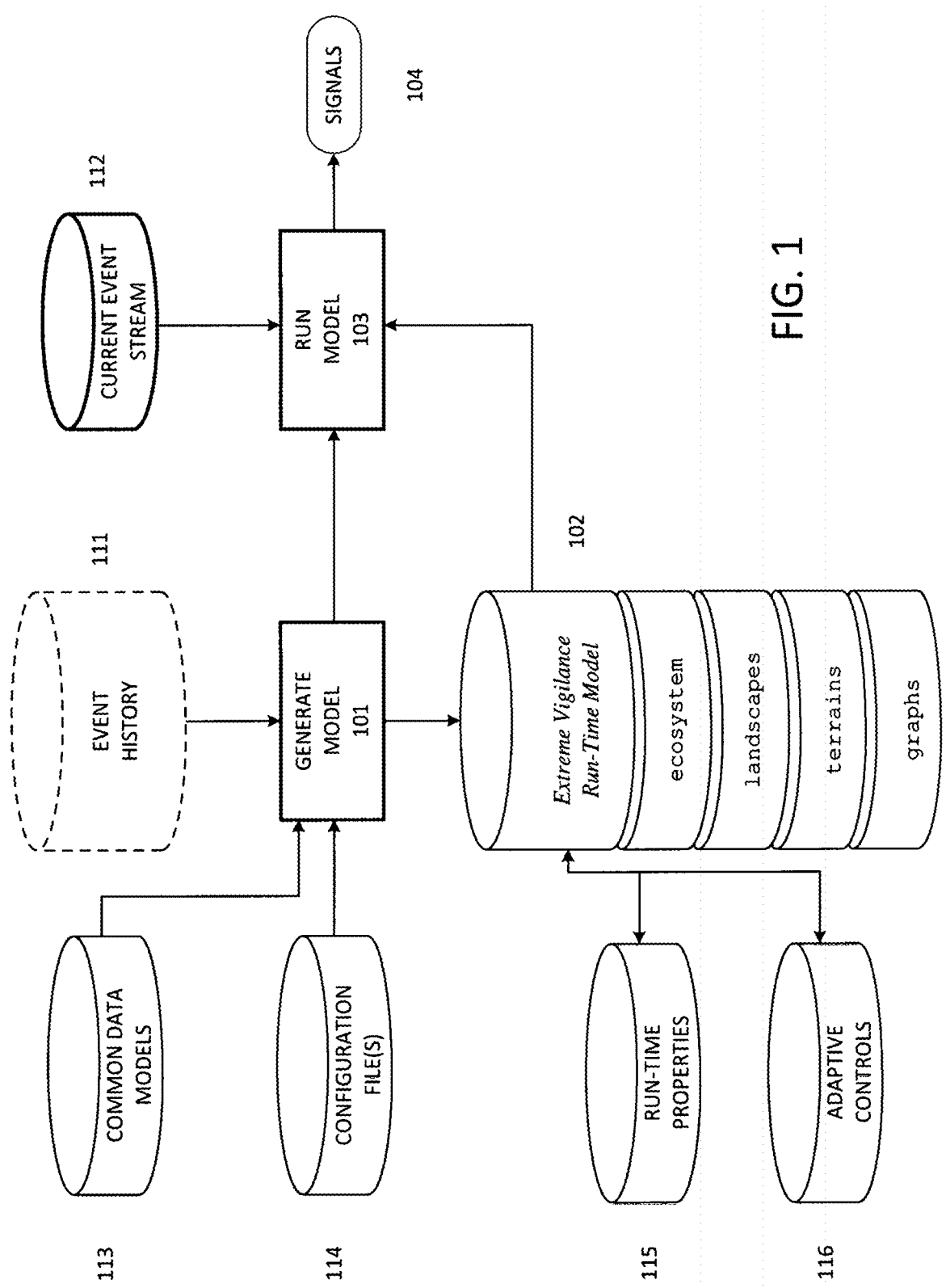
FIG. 1 is a high level operational perspective of the present system showing the way in which a cognitive modeling model is created and how this model is executed.

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Performing the analysis operations at search time provides greater flexibility because it enables an analyst to search all of the performance data rather than searching pre-specified data items stored at ingestion time. The analyst may then investigate different aspects of the performance data instead of being confined to the pre-specified set of data items that were selected at ingestion time.

However, analyzing massive quantities of heterogeneous performance data at search time can be a challenging task, particularly in a dynamic and constantly changing environment, and particularly when the amount of data is excessively large and seemingly infinite. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

Definitions

For purposes of understanding the present design, a set of definitions is provided. Certain terms are provided with initial capital letters but in certain instances initial letters have not been capitalized, including in the claims provided herewith. The interpretation of terminology is intended broadly and may or may not specifically include the defined terms below depending on use.

An Actor may be a person, a device, a transaction, a service, a process, or any other entity that is a core or critical component to a business environment.

An Actor performs Actions. An Action is an event that is represented by a Taxonomy.

Each specific value of the Taxonomy is referred to as a Terrain.

A collection of Terrains involving the same Actor is called a Landscape.

The definition of a Taxonomy is stored in a Data Dictionary.

A Cognitive Model contains the representation of the behaviors of a collection of Actors over a period of time. This knowledge is represented in many forms, including, but not limited to, Landscapes, Terrains, Terrain Cells, Sequence Graphs, Relational Graphs, Fuzzy Rules and Fuzzy Clusters. Cognitive Models store their information in the appropriate data store, depending on the form of the data, as described above.

The information initially stored in a Cognitive Model is determined by which Analyses are relevant to the Taxonomy. This list is stored in the associated Data Dictionary entry for the Taxonomy.

Cognitive Models, amongst other functions, provide the information necessary to perform the initial Analysis of Actor Behavior.

Cognitive Models may represent their "trustworthiness" (Trust) as a fuzzy number between 0 and 1. This Trust is calculated by analyzing the density (amount) of information over the expected density (amount) of information for each Taxonomy. This value is dynamic and will change over time. The higher the Trust, the more accurate (trusted) the results of Anomaly Analyses run against the Cognitive Model.

An Anomaly Analysis is an algorithm that ingests information from a Cognitive Model and generates representations of anomalous Actor Behavior. These anomaly analyses, include, but are not limited to: Threshold, Sequence, Weekly Actor, Week-over-Week Actor, Rule and Peer Analysis.

The anomalies are generated in the form of Cognitive Signals.

A Cognitive Signal is a language construct that represents some form of persistent knowledge. Cognitive Signals can be used as input and/or output of any analysis, algorithm or other component that ingests or generates persistent knowledge. In this system, Cognitive Signals represent persistent knowledge about Actor Behavior.

Cognitive Signals are the input for Hazard Analysis and Threat Analysis.

An Environment is a defined place where Actors perform Actions.

The System is defined as the collection of all components, data stores, algorithms and any executable necessary for the Process to function.

A Resource Mapping describes the relationship of external data fields to data fields in the System. The following is a list of mapping types (more or less may be provided):
COPY-VALUE
SPLIT-VALUE-MULTI-FIELDS
VALUE-MAPPING
DATE-STRING-TO-EPOCH
REGEX-CAPTURE-GROUP
SEARCH-AND-REPLACE
TOKENIZE-AND-EXTRACT A Graph is a collection of nodes (activities) and edges (links between activities) which is initially build with historical data to define an Actor's normal sequence of events on a periodic basis. In the present discussion, there is an individual graph by Actor and day of week to allow the System. Tracking activities by day of the week can be significant because what an Actor does on a Monday can differ greatly from what the Actor does on Friday, Saturday, or Sunday (if anything).

A Node is an activity, described by a Taxonomy, performed by an Actor that is tracked in a graph. Examples of nodes are things like: log into VPN', 'send an email', 'access a web site', log off VPN', etc.

An Edge connects transitions between nodes and maintains a vector of times that the transition occurs, frequency count, and probabilities of transitions between nodes. An example of an Edge is a connection between 'login to VPN' and 'send email' or 'login to VPN' and 'access a web site'. Each time a transition between two nodes occurs, the edge is updated with the time of the transition, and the frequency count and probability of the transition is updated.

An Anomaly is behavior that is inconsistent with normal behavior. An Anomaly has two important properties: severity and degree of inconsistency (or mathematical distance) from normal behavior. The severity is a class of Anomaly assigned by the analytical component that detected and measured the Anomaly. The degree of inconsistency is a fuzzy number.

A Hazard is an unperfected Threat associated with an Actor without regard to any related assets or the behavior of other Actors. A Hazard represents the risk to an enterprise based solely on cumulative multi-dimensional behaviors (that is, anomalous states generated from thresholds, orders of operation (AOO), peer-to-peer similarity, and the Actor's behavior change over time). A Hazard has two particular properties: severity and weighted risk. A Hazard has a severity that is not assigned, but is derived from the collection of inherent terrain risks.

A Threat ties together Actors with the behaviors of other Actors as well as the Assets used by all the Actors in the Hazard collection. Threats develop a sequence of operations over a dynamic time frame. Threats are connected in a heterogeneous Graph where Nodes can be Actors or Assets and the Edges define the frame as well as the strength of their connection as a function of risk.

Criticality, used in Threat Detection, is an importance value (e.g. 1-100) assigned to a resource such as an Actor or Asset. The higher the value assigned, the more important or critical the resource. For example, a server where sensitive enterprise information resides (such as credit card numbers) would have a much higher criticality (i.e. 100) than a server used internally for software testing (i.e. 20). Likewise, an Actor with access to sensitive information like a CFO would have a higher criticality (i.e. 100) than an administrative assistant (i.e. 30).

Actor Criticality: Each Actor is assigned a criticality value based on how much importance should be assigned to the Actor in the Threat Detection process.

Asset Criticality: Each Asset is assigned a criticality value based on how much importance should be assigned to the Asset in the Threat Detection process.

Actor Threat: The Threat Detection process generates an Actor threat for cases when the System determines that an Actor's actions during the threat window time period represents a threat to the enterprise.

Asset Threat: The Threat Detection process generates an Asset threat for cases when the System determines that an Asset associated with one or more Actor threats during the threat window time period is at risk.

Compatibility Index (CIX): The measurement of the fuzzy number that represents how compatible a value is with a Concept.

Cognitive Genetic Algorithm is a method for solving both constrained and unconstrained optimization problems based on a natural selection process that mimics biological evolution utilizing cognitive processes.

Cognitive Evolutionary Strategy is the method for making decisions utilizing Cognitive Genetic Algorithms.

Concept: A qualitative semantic term represented as a fuzzy set.

Context: A collection of Concepts that are mapped to a field or value.

The present design is a cognitive modeling platform providing an advanced fuzzy logic based plug-and-play architecture. Using this architecture, machine intelligence applications can be designed, implemented, extended, tuned, and deployed. The machine reasoning system provides a unique and powerful machine reasoning system that combines qualitative semantics, linguistic variables, fuzzy logic based versions of machine learning and machine intelligence algorithms, multi-objective and multi-constraint genetic strategy functions, as well as a near natural language rule and explanatory capability.

Two components of note in the present design are the Cognitive Modeler (CM) platform and the cognitive modeling suite, component-based system architectures designed to incorporate and extend machine learning, general machine intelligence, computer science, and lines of business analytical functionality. Based on the twin ideas of qualitative semantics (fuzzy logic) and a cognitive signal's "glue," product functionality can be added, extended, removed, or modified. The functional capabilities are designed in terms of "cognitive signal aware" components, enabling straightforward insertion or removal of components, since their only public interface is via Cognitive Signals (aside from the globally underlying Taxonomies in the over-all system ecosystems).

Conventional methods of incorporating machine learning, planning, and prediction have centered on three principal techniques. Statistical inference systems encompass not only traditional statistical analysis approaches (such as those supported by SAS and SPSS), but also machine learning capabilities based on clustering, Bayesian probabilities, decision trees, as well as partitioning and classification. Expert systems are if-then-else rule driven applications that apply an "inference engine" to evaluate rules and follow a path to a particular solution. The rules can be developed by subject matter experts or as part of a statistical analysis (in a manner similar to statistical interference systems or through the process of data mining. The third technique is the use of neural networks, representing layered connectionist machines (either in software or hardware) that mimic the way neurons in the human brain supposedly collect data, aggregate related data elements, prioritize important data relationships, and learn patterns. Many powerful machine intelligence systems, such as IBM's Watson, are based on neural networks.

These approaches are not mutually exclusive. Rules are often combined with or generated from neural networks. Neural networks and rules are often generated by the statistical analysis of data patterns in a process known as "data mining."

However, none of the existing methods of machine learning and machine intelligence incorporate qualitative expression and semantic reasoning implemented through use of fuzzy logic. These techniques lack the ability to consider "shades of grey," reason with conflicting information, reason at a conceptual level as a matter of first principles, and deal with the nature of data in way that reduces cognitive dissonance (that is, in a way that allows the machine to imitate the natural way humans understand patterns in data).

The term "fuzzy logic" has been used in a broad, loose, and imprecise way among the population to mean any system that deals with uncertainties. This, however, is not the real epistemological foundation of fuzzy logic. Fuzzy logic deals with informational ambiguity and deals at the conceptual level rather than the data level. Ability to reason about concepts is a first order capability of fuzzy logic. Reasoning at the concept level is not possible in any other logic or algebraic system.

The present design includes a cognitive modeling component architecture as well as a description of the operational (functional) processes in the architecture. The cognitive modeling component is constructed based on a set of related concepts. The principal concept is an Actor, and functions of the system are organized around a collection of Actors. An Actor causes a change to the state of the underlying model. A cognitive model learns the time-varying behavior of an Actor. The behavior of a single Actor may be influenced by the behavior of one or more other Actors (of various types). Information and knowledge in the cognitive modeling component are organized around Actors according to the following functional and operational architecture. An Actor can be a person (a human being), a machine (a device of some kind), a thing (a vehicle, toaster, meter, sensor, a document, etc.), an automaton (independent intelligent cellular automata), a service (such as a network), or a composite (some combination of Actor types). The properties (characteristics) of an Actor and the properties of an event are determined by a set of application specific Common Information Model (CIM) objects. cognitive modeling CIMs can be fused with client data models. Associated with an Actor is a collection of Terrains and a collection graphs (such as the day-of-week Markov graphs). Terrains and graphs are created from incoming event data. Event data is organized in a set of Taxonomies.

A Taxonomy is a tree-like structure that organizes data according to a precise genotype. A genotype defines the category (or name) of the information at each level in the tree. For a person the genotype means the Actor, an Action, a process, and an event data value (a field or element). The actual values in a Taxonomy constitute the phenotype (which describes the external or instantiated characteristics of the Taxonomy).

Different Actor types have (or can have) different Taxonomic genotypes. Data elements can be shared, via their Taxonomies, across Actors. A Terrain is associated with a data field (either contained in an event or computed from other event or other computed data fields). The Terrain is used to learn the time-varying behavior of an Actor relative to the data field. Terrains are d×t×v (day of year (d), time of day (t), average weighted value (v)) structures that evolve over time to reflect, as noted, the behavior of an Actor for that data field. Data value learning and analysis in cognitive modeling is done primarily at the Terrain level.

A collection of all the Terrains and graphs for an Actor is called the landscape. A graph is a stationary or time-oriented, connectionist architecture that discovers and connects the Actors to Actions, assets, and any other virtual or physical object or concept. Graphs can be Markov or homogeneous or heterogeneous or hyper-graphs. The Order of Operations Markov graphs, as an example, learns the behavior of an Actor for any pre-defined periodicity, e.g. a particular day of the week. The edge between any two Actions (say $A_i$ and $A_j$) contains the probability that an Actor performs Action $A_i$ and then performs $A_j$ within some average interval 0 of separating time, T. A collection of all the graphs for an Actor is called the topography network (or simply, the network) and is part of the Actor's landscape. A named collection of Actors (with their landscapes) is an ecology (or ecosystem) but is informally called a model.

In general, with the foregoing definitions and explanations, the process flow of the design is generally as follows. First, the System provides or executes an Actor/Asset process flow. Such an Actor/Asset process flow may be the first two steps in the overall Process Flow.

A Data Dictionary is created for each Taxonomy. This includes the definition/mapping of the Actor, Action, Process, Field, Value, Source Asset, Destination Asset and Time fields from the data source to the Taxonomy. In addition, the System builds the list of valid Anomaly Analyses.

The System takes in Actors and their associated information. To take in or update Actor information in the System, the System employs a Resource Mapping. The user may create an appropriate Resource Mapping for the Actor data available. The System processes the Resource Mapping to take in this information. Resource Mappings may be run from time to time to reload and/or update Actor information.

Assets and their associated information are taken into the System. To take in or update Asset information in the System, the System uses a Resource Mapping. Again, the user may create an appropriate Resource Mapping for the Asset data available. The System processes the Resource Mapping to ingest this information. Resource Mappings may be run from time to time to reload and/or update Actor information.

Once the Data Dictionary entries are created, the System creates at least one Cognitive Model. The first step is to determine which Data Dictionary entries will be needed by the Cognitive Model.

Next, the System loads historical data from the data source for each Data Dictionary entry. A time period is selected for this historical data.

From the ingestion of historical data, the Cognitive Model is generated. The trust of the Cognitive Model is calculated, as a fuzzy number.

If the Cognitive Model trust is sufficiently high, the Cognitive Model is activated. Once activated, the Cognitive Model schedules a collection of tasks to run that perform regular extraction of actions (events) from the original data source, as well as Anomaly Analyses associated with the Cognitive Model. These tasks may also be run in an On-Demand (ad-hoc) fashion.

The following is the process of an activated Cognitive Model.

For each Data Dictionary entry selected in the Cognitive Model, the corresponding (or calculated) Actor Actions are extracted and then "normalized". In addition to the extraction of an event, Actor Actions may be calculated based information stored in the data source. An Actor Action is "normalized" by converting the original derived (or calculated) event to the specific Data Dictionary format (Taxonomy).

Each normalized Terrain entry is inserted into the Cognitive Model. A list is kept in each entry the Data Dictionary as to which components of the Cognitive Model are to be updated upon Terrain ingestion. All internal structures of the Cognitive Model that need to be updated are then updated.

The process that keeps Models updated repeats at standard intervals.

Anomaly Analyses then runs against Models in a scheduled fashion. These analyses may also be run in an On-Demand fashion. Each analysis runs independent of any other Anomaly Analysis.

Each analysis will extract the relevant information from a Cognitive Model for each Actor over a specified time period. The results of an analysis run are written to the data store in the form of a Cognitive Signal, stating, amongst other things, the Anomaly, the severity intensity as a fuzzy number, the Taxonomy information (see the Taxonomy Definition above), the associated event(s) and all other relevant knowledge necessary to validate the Actor Anomaly.

Independent of Anomaly Analyses, the System runs Hazard and Threat Analyses in a scheduled fashion. These analyses may also be run in an On-Demand fashion. These analyses ingest Cognitive Signals generated over a specific time period, and, in combination with Actor (and Asset) Criticality, determine whether any Actor Behavior is considered to be a Threat. These analyses will output this knowledge in the form of a Cognitive Signal, stating, amongst other things, the Actor, Assets, severity intensity as a fuzzy number, the associated Cognitive Signal(s), and all other relevant knowledge necessary to validate the Actor Hazard or Actor Threat. A high level operational perspective of the present system is shown in FIG. 1, showing the way in which a cognitive modeling model is created and how this model is executed. FIG. 1 is a simplified version for teaching purposes. A cognitive modeling installation involves the creation of an aggregating model. A set of transient models is created on many servers. The computational servers return the transient model to the aggregating model which creates the current run-time model. This run-time model is then sent back to the compute server. The present description does not get into this level of detail but such a level of detail is contemplated and forms part of the design.

FIG. 1 illustrates cognitive modeling operation. The System creates a cognitive modeling model with the xvCreateModel command at point 101. This command uses event history 111 to discover the normal behavior of each Actor (that is, it populates all of the Terrains and builds the day-of-week Markov graphs for each Actor). The xvCreateModel command creates an empty cognitive modeling model. While the System can specify a source of history data with the same command, xvCreateModel name=name, alternately data=<search specs> can be used to specify where to find the repository of history data. Point 102 represents the Persistent Run-Time Model. The persistent model is the disk resident version of the System. Persistent Run-Time Model 102 contains the overall ecosystem. The ecosystem contains a set of Actors. For each Actor the System stores the Actor landscape. A landscape contains the Terrains and the Markov graphs.

During model generation, the system uses a set of application specific Common Data (Information) Models 113 to find the properties of Actors as well as the structure and data contents of events. A client specified configuration file 114 guides the ways in which the physical model is created and installed.

The Persistent Run-Time Model 102 also contains two files updated by the Persistent Run-Time Model 102. These are run-time properties 115. The run-time properties file system is maintained in several states. The first state is the version that corresponds to the current version of the model (which is the date it was last saved). The previous N versions of the model may also be saved. The second state is exploratory. An exploratory properties file is used in the genetic configuration and optimization processes. These functions create a large collection of possible run-time properties (each is a "genome" in a Cognitive Genetic Algorithm) and then seek out the set of properties that maximizes the performance (sensitivity) of the model.

The adaptive controls 116 contain all the parameters and properties used in the machine learning algorithms. These are used by the Cognitive Evolutionary Strategy mechanisms (Cognitive Genetic Algorithms) to optimize the System configuration and the machine learning functions. The adaptive controls form a genome in the genetic tuning system. The genetic algorithm then explores thousands of possible genomes with random variations to find the optimal solution to the learning system configurations.

This phase also creates a series of profile statistics for the model as well as for each Actor and its landscape. From these statistics, the client can decide whether or not to accept or re-generate the model (using more or additional data).

Run Model 103 and Current Event Stream 112 are shown in FIG. 1. The cognitive modeling model starts with the xvRunModel command which provides the name of model to start and the request (search) commands that find and supply the events. The System can start or re-start a slave (remote level) model using the xvStartRemoteModel command. When the System starts a model running, it typically starts with two sets of asynchronous components. The first component set processes each field in each incoming event. This first component checks the data against a set of thresholds and then compares the event against a graph of allowed Action to Action transitions. The second component set contains analyses that run when scheduled. These functions involve advanced (and often time consuming) analyses among many Actors or against the history of behavior of an Actor (compared against many other Actors).

Signal Generation element 104 is also shown. Cognitive Modeling communicates between its analytical components as well as with the outside world through a set of signals. Signals tie the internal machine learning functions together and also tie the cognitive modeling application to client interfaces, and other applications.

Various machine learning and analytical functions underlie a cognitive modeling application. While this architecture is common to all the cognitive modeling applications, some applications may add additional functions and services to the base architecture.

Figure 2:
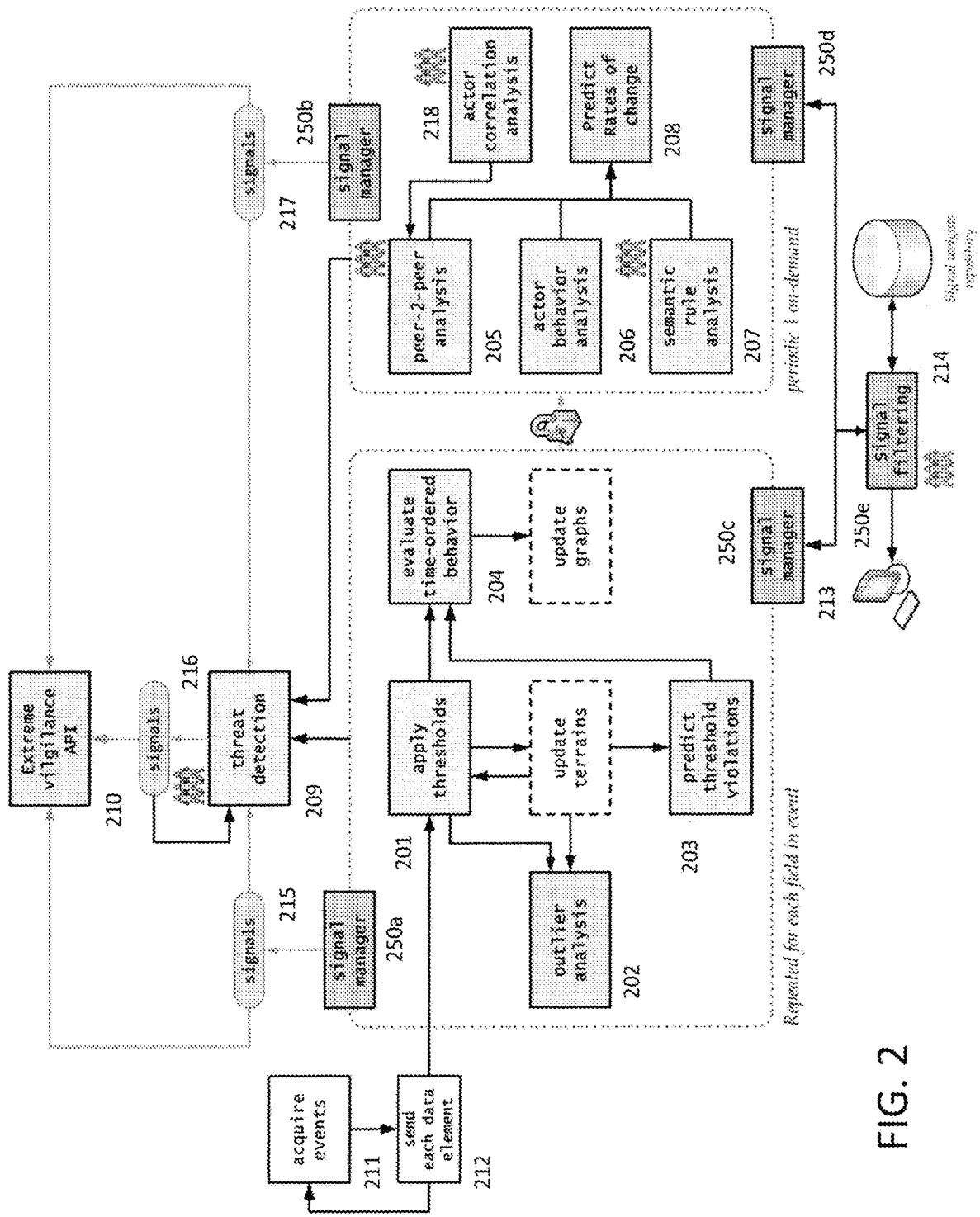
FIG. 2 is a detailed schematic roadmap of core system functions.

FIG. 2 is a detailed schematic roadmap of core System functions. FIG. 2 and this description represent a rather high level perspective but address all the current principal components and show how they are connected to each other.

Boxes in dashed lines indicate an internal, support function for which no explicit cognitive modeling command exists. Boxes 250a-e represent the combined signal manager and the adaptive feedback system (the ability to exclude signals based on any number of content properties, wherein signals 215, 216, and 217 are shown in FIG. 2). Boxes with multiple human-type figures indicate a process that analyzes sets of Actors (instead of individual Actors). Arrows show the general operational flow.

The lock-and-key symbol means that the functions to the right are currently activated by a set of gate-keeping rules which determine when they are executed. That is, the System does not usually run a peer-to-peer analysis every time a new event is sent into the application.

The FIG. 2 design suggests or represents a Minimum Viable Product (MVP) version of cognitive modeling (as a line of products). The MVP system incorporates the core functionality used to detect anomalies (and separate threats from the population of anomalous but not dangerous states).

Note that many machine learning algorithms are very complex and involve subtle time-varying states and state transitions. This document describes, in more or less general terms, what a function contributes to the overall application capabilities.

Element 211 represents Acquire Events. Cognitive modeling begins with the acquisition of events. These events are collected through the xvAcquireEvents request (or through the xvRunModel command which essentially passes its event matching request to the underlying xvAcquireEvents command) An event contains an associated date as well as a set of data fields. These fields are defined in an associated data model (see element 212).

Element 212 represents Sending each Data Element. Using the associated data model (the Common Information Model) the System decomposes an event into a set of its data elements (or fields). The set of N data fields in an event are represented as a three-tuple: (time,field-name,value) (either physically or logically, meaning that the representation of a tuple does not materially the functionality of the System as long as we are dealing with, at a minimum, a three-tuple containing the required members). These tuples are sent into the cognitive modeling environment one at a time. When the complete set of data fields has been sent, the System progresses to the next physical or logical event.

Element 250e is a signal filter which interfaces with signal weights repository 214 and provides filtered signal information to display 213 in this arrangement. Signal filter 250e interfaces with signal managers 250c and 250d.

Element 201 is the Apply Thresholds element. Thresholds detect anomalous data values in events or cumulative anomalous data values on a Terrain. As a data element approaches the threshold violation value, the threshold analysis component begins to emit signals (violation proximity and eventually violation triggered conditions). Very large data values (values that fall outside the domain (or allowable range) of the Terrain) trigger an outlier signal.

Thresholds in cognitive modeling are modeled as fuzzy sets. The use of fuzzy logic allows a measured degree of such conditions as nearness to a threshold, hard and soft violations, and the degree of a violation. Thresholds are dynamically created from the statistical properties of the data using complex data aggregation and discrimination techniques. There are several different kinds of thresholds. Each Terrain (data field) has its own set of thresholds. A Terrain can simultaneously have multiple thresholds across different parts of its surface (that is, as one example, for different time periods).

A rate and degree of change threshold (RDCT) is a trigger. By default, the trigger sits well above (and, in some cases, also below) the distribution mean and some multiple of the standard deviation of the data. But a trigger threshold is not a single value. A threshold is a fuzzy sigmoid space so that the idea of a threshold violation increases rather quickly as a data point approaches the actual threshold.

Outliers are detected by the outlier boundary threshold (OBT), a narrow semi-permeable fuzzy tensor that sits well above (and possibly below) the violation point of a rate of change threshold. An outlier is an event data element or the cumulative value of a Terrain cell that is either four or more standard deviations from the distribution mean or an order of magnitude larger (as measured by the $\log^2$ of the value) than the allowed range of values (that is, it falls outside the domain of the Terrain).

Event data elements that exceed the OBT are not used to update the Terrain. Cumulative data values on the Terrain that exceed the OBT cause the model to either cease updating the Terrain at that day and time region or to put the model into discovery and training mode for that Terrain.

Data elements (either from events or from cumulative Terrain values) that fall outside the outlier boundary threshold are sent to the Outlier Analysis element 202. The Outlier Analysis element 202 determines whether or not the frequency, periodicity, and general value of outliers implies the start of either another data pattern or a change to an existing data pattern. As an example, if an Actor is a project manager who takes on additional large project, then we might expect a considerable increase in email frequencies and size as well as to and from addresses. It is possible that these values exceed the current computed range of the current Terrains. If a pattern is detected, the System uses an adaptive reinforcement learning technique to gradually increase the rate and degree of change threshold as well as the outlier boundary threshold.

As the System continually updates a Terrain, it is important to determine whether or not the time-varying changes in the local Terrain region describe a consistent growth (or decay) in the average value in such a way that, if the trend continues, it will lead to a violation of the rate and degree of change threshold. Predict Threshold Violations element 203 uses a third-order polynomial (nonlinear) regression to make the prediction. This third-order polynomial works well on both linear as well as most non-erratic nonlinear data.

The System employs Evaluate Time-Ordered Behavior element 204 using a mechanism known as a Markov Graph, to learn the general sequence of events performed by an Actor during each day of the week. On day of the week, $D_w$, the graph connects Taxonomic Action $A_i$ with Taxonomic Action $A_j$ by observing that $A_j$ follows (or precedes) $A_i$ with some probability P(k).

Thus when the System receives an event and its data fields, it stores Actions ($A_{i\ldots k}$) in a LIFO queue. When the depth of the Action queue is greater than one, the System can check if each Action pair on the queue ($A_1, A_2, \ldots, A_k$) lies along an edge of the Markov graph for the current day of week. The associated probability of $A_i \rightarrow A_j$ indicates the degree to which the sequence is normal for this Actor on this day or week. Probabilities in this context are treated as fuzzy numbers (that is, they have a bell curve around their value and a degree of expectancy). When the association is not normal (to some degree) the System may emit an anomalous sequence signal.

Actor sequence processing may be as follows. Actor sequence processing and analysis looks at an action performed by an Actor (i.e. login to VPN) and determines if the action is something the Actor normally does relative to a previous activity. If the action is out of the ordinary, the System generates an anomaly signal.

Sequence analysis occurs after the historical graphs for each Actor are built ino order to understand of the Actor's historical behavioral patterns. Processing operates as follows:

for each action performed since the last time the actor's analysis ran:
  retrieve the prior activity performed
  if the prior activity was performed on a day or more earlier that the current activity the prior activity is considered to be the first event of the day. Otherwise, a special Node called 'firstEventOfDay' is considered to be the prior Node.
  else
  the prior activity is unmodified
  Retrieve the edge connecting the prior activity with the current activity if the edge does not exist
this is the first time the new activity has been performed, generate an unusual activity signal and process the next activity.
Retrieve the total frequency count of all Edges that transition away from the prior activity.
derive the strength of the Edge connecting the prior activity with the current activity: strength=(currentActivityFrequenceyCount/priorActivityFrequencyCount) which is a probability value between 0 and 1.
Add the current transition probability to a cumulative transition probably which tracks the average strength of all transitions in the current day.
If the derived probability is near 0 (for example, between 0 and 0.02—very rare transition)
generate a rare Actor sequence signal
else if the derived probability is less than or equal to minimum allow edge strength (0.05)
generate an uncommon Actor sequence anomaly signal (rare transition)
else
The transition is valid
if the cumulative Edge strength is less than minimum allowed cumulative Edge strength
emit low average Edge strength anomaly indicating the strength of the Actors transitions for the day is lower than expected
Persist changes made to the Graph to allow subsequent runs to pick up where this analysis left off.

The Markov graph cannot indicate or provide fundamental prerequisite Actions. That is, the System is completely data driven. The System cannot learn that one must authenticate oneself to a network before one uses that network (to send emails, as an example). Authentication regularly precedes other Actions can be learned (thus there is a graph edge authenticate→sendEmail). Hence if one sends an email before authenticating the graph, system analysis would detect an anomaly.

Peer to peer analysis element 205, also known as Actor behavior analysis element, detects anomalous behaviors among Actors (mostly Actors) who are work-specific peers—that is, they are assumed to share the same kinds of tasks. During peer analysis the System computes the similarity between shared Terrains among the peers. The degrees of dissimilarity (based on fuzzy similarity functions) between Actors reflects the degree of anomalous behaviors within some subset of Actors. The stronger the peer grouping the more reliable the analysis. Strength is measured by two factors: how much the Actors are actually peers and how much history exists (the density (trustworthiness) of the Terrains). As part of this analysis the System computes two particular metrics: trust and cohesion index.

Peer to Peer Analysis generally operates as follows. Peer to Peer Analysis is designed to detect anomalous behavior amongst a group of Actors considered to be peers. The Actor attributes that define the peer group are specified by the caller and can be any of the attributes defined on the actor object (which is extendable). Examples of attributes that can be used to group peers may include but is not limited to:
actorType (person, machine, device, etc)
gender (person only)
businessUnit
title
managedBy
category
geoLocation bounding box
region
class
tag The peer to peer processing works as follows:
1. Identify Actors that are part of the peer group as specified on command line: Currently limited to an Actor's: actorType, business unit, category, managedBy, etc. Actors in cache are first identified as matching criteria, then the System examines the model and every Actor with a corresponding landscape on disk is placed into an ecosystem. If models for a selected Actor do not exist, such Actors are excluded from analysis (since there is no data to compare).

2. One by one, the System compares each Actor's Terrains to all other Actors in the peer group and cache results. Since the System is comparing all peers, the comparison for each Actor combination only happens once. For example, for three actors (harry, earl, and joe), only three comparisons occur:
harry->earl, harry->joe, then earl->joe.

For each Terrain compared, the System aggregates the Terrain's data into a compressed terrain matrix that is cached for later use. The shape of the matrix and data contained is controlled by the properties below in bold. The other properties included are used to tweak the behavior of the Peer comparison algorithm.
xv.peeranalysis.lookbackWindowDays=30
xv.peeranalysis.daysInterval=3
xv.peer.analysis.periodInterval=16

The properties above indicate that 30 days of data may be aggregated into a 10×6 matrix. Each cell contains three days of data in a four hour time window where x is days and y is time period.

3. After all comparisons are complete, the System performs anomaly detection. The System emits signals during the anomaly detection phase. These properties are used to control the Peer Comparison anomaly detection processing:
xv.peer.analysis.faultyPeergroupAlphacut=0.80
xv.peer.analysis.anomalousActorAlphacut=0.85
xv.peeranalysis.countZeroSimilarityCells=false
xv.peer.analysis.genereate.virtual.terrains=true
Empty non virtual terrain diagnostic will be added if terrain event count is less that this value.
xv.peer.analysis.empty.terrain.count.threshold=10
Low terrain similarity diagnostic will be added if terrain similarity is less that this value.
xv.peer.analysis.low.terrain.similarity.threshold=0.70
Percent threshold that determines who receives outlier terrain diagnostic for non-core terrains.
If the number of actors with the terrain is above this percent actors that don't have the # terrain will receive the diagnostic. If the number of actors with the terrain below this percent # the actors that have the terrain will receive the diagnostic. Goal is to send the diagnostic to # the minority of users
xv.peer.analysis.outlier.terrain.actor.count.percent=0.50

Anomaly detection/signal generation processing operates as follows:
1. Output Landscape similarity signals:
a. Output raw compressed terrain data signal for each actor terrain that was included in the p2p comparison: actorId, terrainId, matrix of data counts (cell by cell)
b. Output actor terrain similarity results—actor1Id, actor2Id, terrainId, matrix of similarity results (cell by cell)
c. Output landscape similarity results—actor1Id, actor2Id, landscape similarity value.

2. Actors are then ranked against their peers and actor ranking signal emitted, anomalous actors are also identified based on ranking. Actor ranking works as follows:
   a. Calculate the peer group mean similarity which is the average actor landscape similarity value across all peer comparisons that were performed.
   b. Determine if the peer group is 'faulty' which means the average similarity across all peers is less than the faulty peer group alpha cut (0.80)
   c. For each Actor, derive his average similarity to other peers then divide through by the peer group mean similarity to drive Actor ranking. If Actor ranking is below alpha cut (0.85) then Actor is considered anomalous due to low similarity with peer group. The System may store and emit a diagnostic message as part of an anomalous Actor signal at a later time.
   d. Emit actor ranking signal listing the ranking of each actor as calculated above.
3. Generate P2P Similarity Matrix signal—lists actors on X and Y axis and similarity result for each comparison. Results provide this data:

| | atrisler | blinebaugh | capela | cindy | cyrus | pepper | pwrchute | rfrie | sasha | sstansbury |
|---|---|---|---|---|---|---|---|---|---|---|
| atrisler | 1.00000 | 0.90834 | 0.90145 | 0.78997 | 0.75336 | 0.79079 | 0.78929 | 0.79361 | 0.62779 | 0.76421 |
| blinebaugh | 0.90834 | 1.00000 | 0.90297 | 0.80029 | 0.76248 | 0.79781 | 0.80016 | 0.79398 | 0.63443 | 0.76102 |
| capela | 0.90145 | 0.90297 | 1.00000 | 0.78336 | 0.75750 | 0.79612 | 0.77541 | 0.79863 | 0.62909 | 0.77536 |
| cindy | 0.78997 | 0.80029 | 0.78336 | 1.00000 | 0.76111 | 0.79923 | 0.79993 | 0.78824 | 0.62685 | 0.76080 |
| cyrus | 0.75336 | 0.76248 | 0.75750 | 0.76111 | 1.00000 | 0.75817 | 0.73052 | 0.75831 | 0.59904 | 0.75207 |
| pepper | 0.79079 | 0.79781 | 0.79612 | 0.79923 | 0.75817 | 1.00000 | 0.80094 | 0.80330 | 0.62876 | 0.77367 |
| pwrchute | 0.78929 | 0.80016 | 0.77541 | 0.79993 | 0.73052 | 0.80094 | 1.00000 | 0.78374 | 0.62041 | 0.77128 |
| rfrie | 0.79361 | 0.79398 | 0.79863 | 0.78824 | 0.75831 | 0.80330 | 0.78374 | 1.00000 | 0.62102 | 0.76405 |
| sasha | 0.62779 | 0.63443 | 0.62909 | 0.62685 | 0.59904 | 0.62876 | 0.62041 | 0.62102 | 1.00000 | 0.60370 |
| sstansbury | 0.76421 | 0.76102 | 0.77536 | 0.76080 | 0.75207 | 0.77367 | 0.77128 | 0.76405 | | |

4. Outlier Terrains are identified and signals emitted for each. An outlier Terrain is one owned by a minority of Actors in the peer group, identify anomalous Actors based on outlier Terrain ownership. An outlier Terrain is one owned by, e.g., 50% or less of Actors in the peer group (this value is configurable). Actors that have the outlier Terrain are flagged as anomalous.

5. For each anomalous Actor identified above, rank Terrains and emit Terrain ranking signals. Such ranking helps identify those Terrains in Actors with anomalous behavior that could be of interest. Terrain ranking is calculated by obtaining the mean similarity for each Terrain compared and then dividing the Actors mean similarity for the Terrain against the peer groups. If the Actors mean similarity versus peer group mean is less than the alpha cut (e.g. 0.85) then the Actors Terrain is considered anomalous.

6. Emit anomalous Actor signals with details as to which Actor was identified as anomalous.

7. Emit P2P Analysis profile signal—Provides a summary of the analysis including criteria used to identify the peer group, trust index, and overall results.

In peer analysis, it can be beneficial to cluster together a set of Actors that generally do the same kinds of work. The more specific the clustering the more reliable (more trustworthy) the peer analysis. But the more robust the clustering, the more revealing the peer analysis. That is, if the cluster is so specific that it only includes a few Actors, it might be reliable but may not reveal larger Actor trends in the Environment. If the clustering is less specific so that it includes a large number of Actors, it might reveal what appears to be larger Actor trends, but these trends might not be reliable. Hence clustering Actors on their business unit (sales, IT, Marketing, customer support, engineering, and so forth) yields a meaningless grouping because there are so many different jobs. Clustering on business unit and age would also be meaningless because the business unit is general and age does not qualify the business unit into jobs that are similar. The present System, as discussed below, employs Actor Correlation Analysis 218 for a method of selecting peer groupings based on the inherent behavior correlation between Actors sharing the same external properties (age, job title, authorities, demographics, geographics, work periods, and so forth).

Actor Correlation Analysis 218 applies Pearson's r correlation to all the Terrains similarities over L time periods over all the Actors (Actors). The System then organizes the A×T (Actors×Terrain similarities) by clustering on the absolute value of $r^2$ to identify the centers of gravity of Actor groups having a highest degree of similarity (regardless of their underlying peer properties). When simply attempting to discover correlations, whether the correlation is positive or negative does not matter in the initial analysis. Thus $r^2=+0.8$ and $r^2=-0.8$ both indicate a relatively high degree of correlation. The direction of correlation is a matter of interpretation. The nature of fuzzy clustering facilitates developing a set of outward frontiers for each cluster to conceptually match Actors based on the population of shared Terrains at a specific contextual (conceptual) level of similarity Using the Actor Behavior Analysis component 206 the System examines the change in an Actor's behavior over time by comparing the similarity of past behavior (the history) and current behavior. Two flavors of behavior change the analysis: aggregate Terrain segmentation and repeating day of the week. In aggregate Terrain analysis the System decides how much history to use (this is L, the run length of the analysis in terms of M). The System then partitions a Terrain in M×N rectangular segments (where M equals the number or prior days of the year (an even division of L) that constitute a segment, and N equals the range of the time of day). The System then computes the over-all similarity of an Actor's behavior for each pair of segments. The System then computes the degree and rates of change in behavior over all the segments, indicating whether an Actor's behavior is subtly (or obviously) changing over time.

In the repeating day of week analysis, the System also determines how far back in history to use (this is L, the run length of the analysis in weeks). Instead of aggregating a Terrain into clusters of M×N time periods, specify D×N, where D is the day of the week (Sunday=0, Monday=1, etc.). The System then moves back through history for L weeks, comparing the similarity of D at L with D at $L_{-1}$, D at $L_{-1}$ with D at $L_{-2}$, D at $L_{-2}$ with D at $L_{-3}$, and so forth. The signed sum of the differences in similarity provides a rate of over-all change in behavior.

Actor week to week analysis operates as follows. A Terrain event represents a single action being tracked in an Actor's terrain. The following is an example illustrating a sample event split into multiple Terrain events or actions. In this case the incoming event is a record of an email sent by an actor:

{user: john@doe.com, time: 300000, recipientCount: 2, recipients: "jane@doe.com, joe@doe.com", emailSize: 1000, emailAttachmentSize: 20000, src: "1.2.3.4", dest: "4.5.6.7" }

In this case the incoming event can result in multiple Terrain events or actions as directed by the Data Dictionary. The System tracks recipientCount, emailSize, and emailAttachment size. In this example the System has three terrainEvents or actions:

terrainEvent1: actorId: john@doe.com, time: 300000, src: "1.2.3.4", dest: "3.4.5.6", field: "emailSize", value: 1000, key: 1234 terrainEvent2: actorId: john@doe.com, time: 300000, src: "1.2.3.4", dest: "3.4.5.6", field: "emailAttachmentSize", value: 20000, key: 1234 terrainEvent3: actorId: john@doe.com, time: 300000, src: "1.2.3.4", dest: "3.4.5.6", field: "recipientCount", value: 2, key: 1234

The System stores each of these events in its own Terrain. The System also adds each event's value to the 15 minute cell identified by the event's time.

Terrains maintain a matrix of compressed values for each event received during a specified (e.g. 15 minute) time period. For example, if the System is tracking email size and a user sends ten emails (1000 per email) between 9:00 and 9:15, the email size Terrain's cell for time period 9:00-9:15 will have a frequency count of ten, a value of 10000 and an average value of 1000 per event received.

A Terrain matrix is a Concept used by the System to aggregate Terrain cell values into different groupings of cells that can be compared with other Terrain matrices. A matrix has two dimensions: x (days) and y (hour of the day 0-23). The number of days and hours of day occupied by each cell depends on various factors and may be established by a user or by the system.

Figure 5:
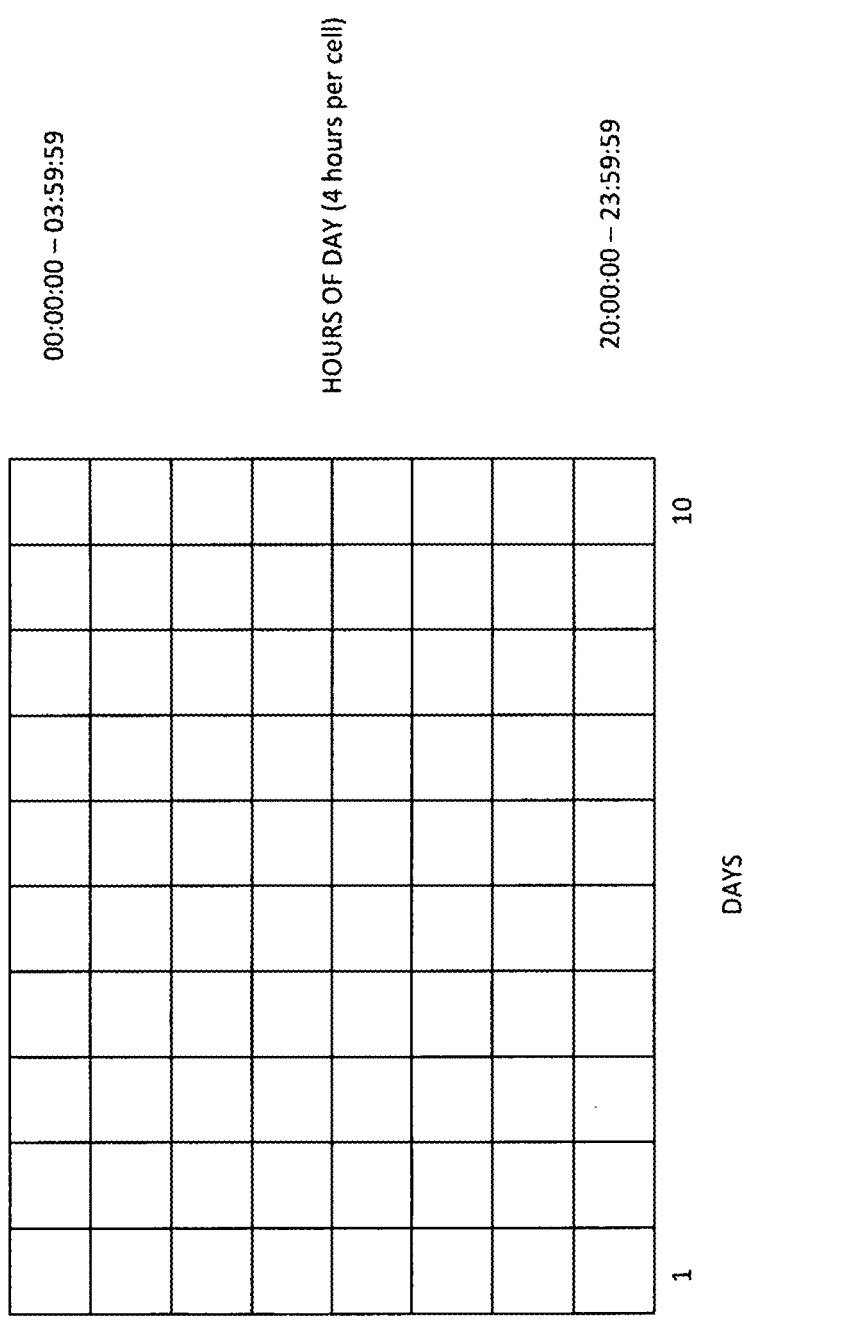
FIG. 5 illustrates an example of a compressed matrix.

FIG. 5 is an example of a compressed matrix having ten days of data (x axis) and eight periods of the day (four hours per period). Like the 15 minute Terrain cells, each cell in the matrix of FIG. 5 maintains a frequency count and value for all events received during the time frame (day(s) and hours of the day). The data represented is the summary of all data in the aggregated time period for a single Terrain which can be compared against another Terrain cell (belonging to the same or a different actor by the various analyses performed by the System).

Actor week to week analysis looks at an Actor's behavior Terrain by Terrain in week chunks to determine if the Actor's behavior is changing over time week to week. If there is enough of a change in the Actor's behavior over time, and the System emits or transmits anomalies. For example, such analysis recognizes when an Actor goes on vacation for a week due to the lack of activity where there is normally activity. The System does the following to accomplish this goal:

for each terrain in the Actor's landscape:
  generate a week aligned terrain matrix aligned from Monday-Sunday for a configurable number of weeks in the past (eight for example)
  for each of the aggregated terrains (week1-week8) compare each cell from weekX with weekY (week1-week2, week2-week3, etc) and derive a similarity CIX for all cells compared. Then generate an overall similarity CIX for the week to week comparison (i.e. week1-week2).
  When all weeks have a similarity CIX value for the week to week comparison, derive percent change. If percent change is above or below an acceptable threshold (i.e. +30% or −30%) then consider the Terrain anomalous and generate an anomaly signal.

For each Terrain compared, the System derives an overall similarity CIX by averaging the similarity CIX of every week to week comparison. Then an overall similarity CIX is derived by averaging the similarity of each over all terrain similarity CIX. If the Actor's overall average CIX is below an acceptable value, then the Actor is considered anomalous and an anomaly signal is generated indicating the Actor's behavior is significantly different than what has been learned historically. This may occur if many Terrains are dissimilar over the period of time analyzed.

Figure 6:
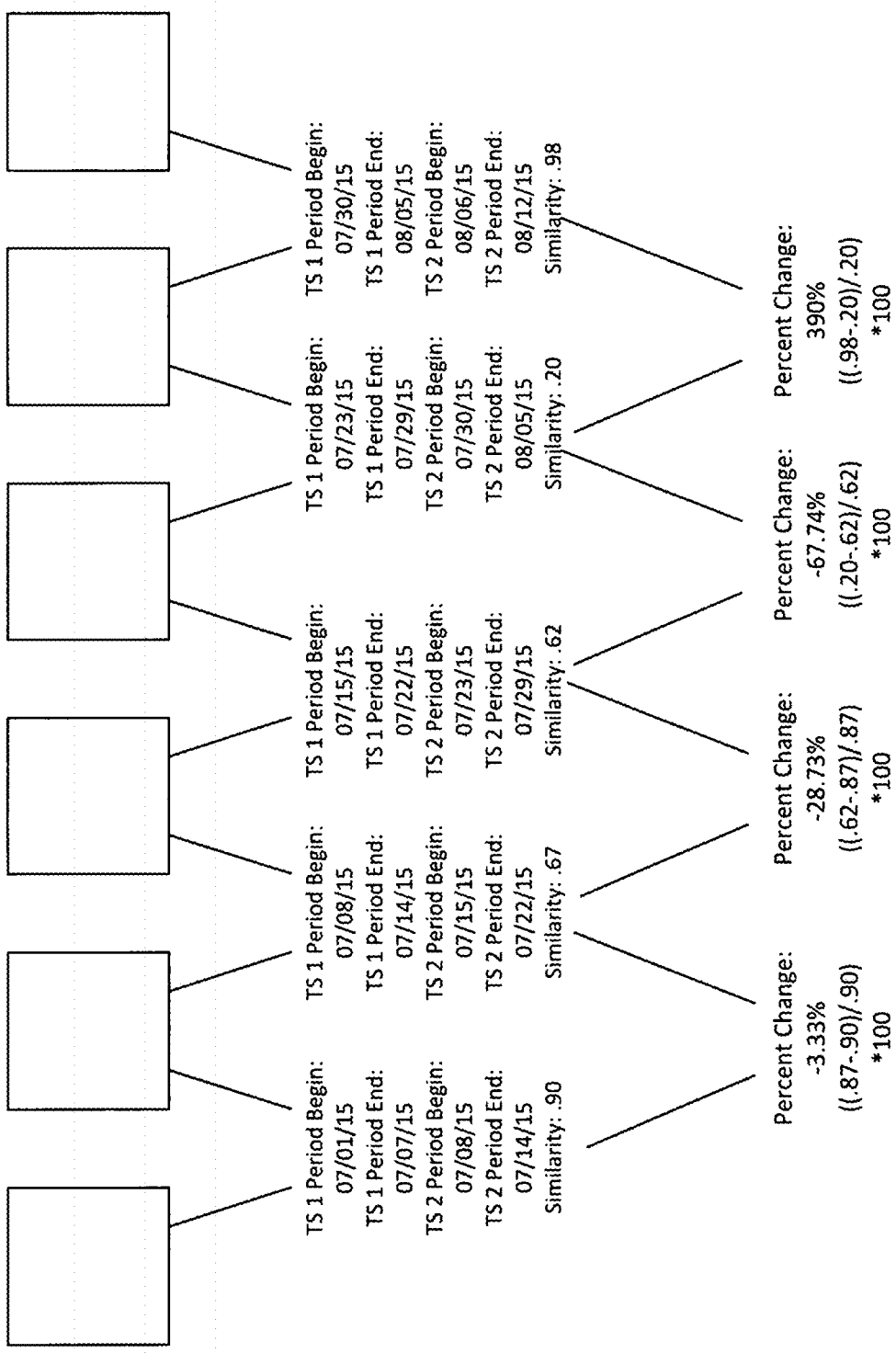
FIG. 6 visually depicts a week-by-week comparison.

FIG. 6 visually depicts this week by week comparison.

The Actor day of week analysis is similar to the Actor week to week analysis except that an Actor's behavior for a day of the week in the past is compared with N weeks prior to determine if the Actor behaved on the day of week being tested like the same day of weeks in the past. In this case, for the day of week being compared (i.e. Monday), the System creates two compressed matrices for each terrain. The first contains historical data in the form of a terrain matrix and the second contains the day of week being compared. The logic/processing for Actor day of week comparison is as follows:

for each terrain:
  generate a compressed matrix of activity N weeks in the past (starting one week prior to the week being compared)
  generate a compressed matrix of activity for the week being tested (i.e. last Monday)
  generate a similarity CIX matrix showing the similarity of cells from the historical matrix versus the week being compared and derive an overall similarity by averaging all the similarity CIX values for the terrain.
  if the overall terrain similarity CIX is below an acceptable value the consider the terrain anomalous and generate an anomaly signal
  generate an overall similarity CIX value by averaging all CIX values of each of the terrain similarity CIX values generated. If the overall CIX value is below an acceptable value, consider the actor anomalous and generate an anomaly signal.

Semantic Rule Analysis element 207 is a rules engine underlying the principal analysis framework that encodes conditional, provisional, cognitive, operational, and functional knowledge. Rules are stored in a named rule package. Inside the rule package, rules are organized in rule sets according to their execution priorities and other conditions.

The rules generally have the form:
  when <premise> then <Action>
where premise is any set of fuzzy, crisp (boolean), or hybrid propositions possibly connected by an "and" or "or" element. The Action sets the value of an outcome variable or the degree of compatibility (truth) in the global measure of knowledge across all the executed rules.

Predict Rate of Change element 208 is shown. Although the techniques are different, the System benefits from studying the change in behavior over time for peer to peer, Actor behavior change, and Actor correlation analysis. By storing similarity and correlation results (including fuzzy clustering centroids) over time, the System can apply auto-regression and polynomial regression analyses to various kinds of behavior history in order to compute, with standard error of estimates (SEE), future behavior, the rates of change, and the rates of the rate of change (how quickly (or slowly) is change taking place). Such discovery of rates in change and the acceleration (or deceleration) of this rate is useful in detecting and quantifying various layers of anomalous behavior.

Threat Detector 209 provides for the discovery and quantification of a threat (along with its severity, cohesion, and root cause), providing a principle outcome of the cognitive modeling application. The core idea is to learn how to separate a collection of anomalous behaviors from the (hopefully) smaller collection of anomalous behaviors that actually constitute (or will constitute) a threat. In order to do this the System considers the forest of signals emitted during the underlying behavior analyses (elements 201 through 208) as the support evidence for threat assessment. That is, the System applies data mining (against the signals) and machine learning techniques (primarily clustering and discrimination analysis) to isolate and clarify real threats. Threats are then classified (via a Bayesian network) into one of five severity levels (conceptually in a spectrum similar to the military DEFCON approach). Threats are also grouped by their type. Any number of threats, such as nine types of threats, may be classified.

The process of threat/threshold analysis compares action values and the average of action values grouped by time (into cells) against calculated threshold values. The System calculates the threshold value using on the actor's historical data to derive a baseline of 'normal behavior'. Threshold or threat analysis can be divided into the following:

a. Threshold—a threshold exists for each actor's terrains (actor, action, process, field) for each day of the week and time of day. For each terrain there are seven day of week thresholds with six sets of values (fuzzy numbers) each pertaining for a four period of the day (i.e. 00:00:00-3:59:59, 4:00:00-7:59:59, 8:00-11:59:59, 12:00:00-15:59:59, 16:00:00-19:59:59, and 20:00:00-23:59:59). A threshold is a fuzzy number, represented as a right facing S curve which has a domain min values (e.g. 50), inflection point (e.g. 60), and domain maximum value (e.g. 70) which represents an actor's normal amount of activity as learned from historical data. As values approach and exceed the domain maximum value they are considered anomalous. A threshold also has an outlier boundary. This boundary represents a value that is considered an outlier. The System calculates this outlier boundary using the standard deviation from events used to generate the threshold multiplied by a configurable value plus the domain maximum value. The outlier boundary is typically greater than the threshold's domain maximum value and is a fuzzy number, represented as a right facing S curve just like the threshold. To summarize, each threshold contains the following values: domain minimum (bottom of S curve), domain maximum (top of S curve), and outlier boundary which is an S curve that sits to the right of the threshold starting at the threshold's domain max extending to the calculated outlier boundary value.

b. Action Value Analysis—Action values are tested against the terrains threshold using the time of the event to determine which threshold to compare (day of week and hour of day). In this case the System compares the actual value of the action (i.e. 100) against the threshold to derive a Compatibility Index (CIX). If the CIX is 1.0 (value is greater than or equal to domain max) then the value is said to be in violation of the threshold. In this case the System emits a signal. If the value is less than domain max but greater than the near threshold alpha cut (0.65 for example) the value is considered to be a 'near threshold violation', in this case an anomaly if less importance that a threshold violation is generated. Last, in cases of a threshold violation, the System determines how much of a violation the value is by deriving a CIX against the outlier boundary threshold (S-Curve). If the action value is greater than or equal to the outlier boundary (CIX 1.0) then the action value is considered to be an outlier and the system generates an anomaly signal. If the value is greater than the threshold domain max value but less than the outlier boundary (outlier boundary cix is less than 1.0) then the derived CIX is added to the threshold violation signal to indicate how much of a violation the value is against the threshold.

c. Terrain Cell Analysis—Terrains maintain a matrix of compressed values for each event received during a 15 minute (by default, but other times may be used) time period. For example, if the System is tracking email size and a user sends ten emails (1000 per email) between 9:00 and 9:15, the email size terrain's cell for time period 9:00-9:15 will have a frequency count of ten, a value of 10000. and an average value of 1000. The terrain Cell analysis compares the average value (1000 in this example) against the threshold generated for the day of week and time of day to determine if the activity over the current time period being tested is in violation of the threshold. The same tests described for event values are performed in this case but using the terrain's values rather than the event value itself.

d. Unusual Activity Time—The threshold analysis can also identify events that occur during an unusual time by looking at the threshold selected to compare against the event and cell value. If the threshold has a 0 value (i.e. no historical activity during this day of week and time of day) then the event is considered unusual.

e. Unusual Asset Access—An event can have optional associated source and destination assets. For example, an event can originate of a source (i.e. IP address) and terminate at a destination (i.e. IP address). The terrain tracks all source and destination assets that events contained have accessed. If an action originates from or is terminated by an asset not in the list learned from historical information, the source asset or destination asset is considered unusual and the System emits an anomaly signal.

Cognitive modeling component 210 (also known as the Extreme Vigilance component) is designed for use outside the Environment. The outside world can communicate with the cognitive modeling component in two ways. Consuming signals is bi-directional and may provide the most extensive communications interface method. The REST Application Program Interface is a bi-directional item that connects any program to the cognitive modeling component. The REST Application Program Interface has two related gateways. The primary gateway is to the Threat Detection process which returns threats and the threat's support chain. A secondary gateway interacts with cognitive modeling at the command level, allowing the host application to issue commands and collect information.

The system also includes cognitive rule analysis functionality. In cognitive rule analysis, a rule package is a grouping of one or more rule sets and defines a logical grouping of rules that may be executed together. A rule set is associated with a taxonomy (Action, Process, and Field) and defines the events to test against the rules in a rule set. A rule set includes 1 . . . N individual rules tested against events retrieved from an Actor's Terrain(s) to be tested. The Taxonomy can be fully qualified: e.g. Transaction~Beef~TransactionAmt or can use a wild card to match multiple terrains: e.g. *TxnAmt. A rule is an individual rule to be tested as part of a rule set either against an event or collection of events (cell) for a period of time (hour, day, week, month). A rule consists of a condition to be tested (when clause), then clause, and rule weight. The value tested is defined in the when clause which can contain operators:

value—The value from the event
count(hour)—The count of events from the event's terrain in the current hour of the day (1:00:00-1:59:59)
count(day)—The count of events from the event's terrain in the current day: (00:00:00-23:59:59)
count(week)—The count of events from the event's terrain for the current week (Sunday-Saturday)
count(month)—The count of events in the event's terrain for the current month of year (1st—last day of the current month).

Context is generated using historical information from the Terrain(s) and is used to compare the value to determine which term the value (event value or count) falls into. The rule compares the value tested against the context to determine compatibility of the value with the context's concept called out in the rule. For example, a rule that says "value is low" compares the event's value against the context's concept named low' to determine compatibility (CIX) with the concept's value.

The rule analysis runs against a model and rule package and time range. Processing may operate as follows:
for each Actor in the model for each rule set:
retrieve events that match the rule set's terrain(s) (absolute or wild card)
for each matching event
for each rule in the rule set
retrieve the valueToTest called out in the rule (event value or count over time)
compare the valueToTest with the context's concept called out in the rule and derive a CIX
Add cix*ruleWeight in a variable called cixSum
Add rule weight to a variable called weightSum
derive overall CIX by: cixSum/weightSum
if weight is less than an acceptable value (i.e.: 0.20) then the event is considered anomalous to the ruleSet, emit an anomaly signal Cognitive Signals Cognitive Signals are discussed here at a relatively high level. Cognitive signals provide bi-directional intra-application communication, inter-product communication, and application to client communications. Signals are automatically generated by all functional, analytical, and operational components of the Cognitive Model platform as well as every cognitive modeling application in the System. Clients may also generate, store, and use their own signals. The rule language will emit Cognitive Signals when specific rule conditions are satisfied.

Cognitive Signals (signals) are emitted by and consumed by all the analytical processes in the Cognitive Modeling (CM) platform as well as by all features built on the CM platform. While signals share many common attributes of audit entries and events, they constitute a privileged layer in the System's cognitive modeling operational and functional capabilities. Signals form a much deeper and more fundamentally integral fabric within the System.

The entire cognitive modeling platform as well applications built on this platform generate a wide spectrum of "Cognitive Signals." These signals are called "cognitive" because they reveal the underlying, time-ordered sequence of operations used to learn behavior patterns and then apply these patterns to detect trends, changes, anomalies, hazards, and threats. The signals are continuously generated inside the Cognitive Modeling platform by the execution of qualitative expression enabled machine learning, statistical analysis, knowledge-based policies (cognitive rule packages) and other computer science, heuristic, and artificial intelligence services.

Signals are consumed by different components of a CM-based feature, are consumed by different CM features (as one example, signals from the cognitive modeling for Behavior application can be used by cognitive modeling Anti-Fraud), are consumed by the component that actually emitted the signal (they are reflective), are consumed by client applications, and are consumed by commercial data analysis packages.

Signals are grouped according to their source. The most common sources include SYSTEM (application execution states), AUDITING (application control flow), DATAANALYSIS (incoming event and data model Actions), ORDERANALYSIS (learned Actor sequence of operations), PEERANALYSIS (Actor peer-to-peer similarity analysis), RULEANALYSIS (rule analysis Actions), HAZARDANALYSIS (generated Actor or asset hazards), THREATANALYSIS (critical enterprise threats). As new functionalities are added to the CM layer, existing application refined or extended, and new applications are developed and deployed, additional source types may be developed, extended, or combined.

A set of categories captures the state of the analytical at various points in the analysis process. The prolog category captures the state of the global or local model just before algorithms are executed or other state changing functions are applied. The details category captures the information about data and statistics as the analysis progresses, the Action category captures the type, severity, and anomaly "trigger" states for any anomaly, hazard or threat; and the epilog category captures any important state changes that exist beyond the emission life of the signal.

In this context, the process of Hazard detection involves performing statistical analysis against a set of Actor Anomalies that occurred during the analysis time period, also known here as the "threat window." Inputs to the Hazard detection process are a set of model-specific Actor Anomalies that occurred during the threat window time period (e.g. 24 hours). Every signal has a severity assigned, the severities in low to high severity value may include warning, caution, alert, and severe.

Hazard detection processing operates as follows:

Derive resolutionPeriodHours with its threatWindowHours (24) divided by number of resolution periods (e.g. four), in this case each resolution period would be six hours.

Create a matrix of signals organized by severity and resolution period (which is a sub-set of the threat window time period. The matrix has Hours on the X axis and signal severity on the Y axis. The matrix maintains a count of signals during the resolution period at each severity. Below is an example of the matrix:

|  | 00:00 < 6:00 | 06:00 < 12:00 | 12:00 < 18:00 | 18:00 < 24:00 |
|---|---|---|---|---|
| # Warning |  |  |  |  |
| # Caution |  |  |  |  |
| # Alert |  |  |  |  |
| # Severe |  |  |  |  |

Derive the signal promotion mappings which defines how many signals in a resolution period of each type (warning, caution, alert, severe) it takes to cause the severities of those signals to be promoted. This is done as follows:

a. Get severity value mappings:
m_severityValueMappings [scmSignal::Severity::UNDEFINED]=0;
m_severityValueMappings [scmSignal::Severity::INFORMATION]=0;
m_severityValueMappings [scmSignal::Severity::WARNING]=2;
m_severityValueMappings [scmSignal::Severity::CAUTION]=3;
m_severityValueMappings [scmSignal::Severity::ALERT]=4;
m_severityValueMappings [scmSignal::Severity::SEVERE]=5;
m_severityValueMappings [scmSignal::Severity::FATAL]=0;

b. Get severity weight mappings:
doublem_warningSeverityWeight=1;
doublem_cautionSeverityWeight=5;
doublem_alertSeverityWeight=20;
doublem_severeSeverityWeight=50;

Get hazard promotion multiplier which is the multiplier to apply to the signal promotion algorithm (the default value may be, for example, 0.25) multiplied by the number of hours per resolution period (e.g. six)

Get severity promotion mappings for each of the severities:
double signalCount=((double)((maxSeverityValue-severityValue)+1))*promotionMultipler;

The following is log output from the Hazard detection process using default values showing the number of signals required at each severity to cause promotion:

Severity Promotion map—derived max signal severity value: 5
Calculated signal promotion count 6.0000 for severity: WARNING
Calculated signal promotion count 5.0000 for severity: CAUTION
Calculated signal promotion count 3.0000 for severity: ALERT
Calculated signal promotion count 2.0000 for severity: SEVERE Perform signal promotion which entails promoting the severity of signals during a resolution period window (time period) where the number of signals exceeds that severity signal promotion count. After promotion the signal count matrix above may be adjusted (if necessary) with counts of signal per resolution period.

With the signals promoted, calculate risk exposure for each terrain. An example of pseudo code for this process is as follows:

for each Actor Terrain with an Anomaly signal
  for each resolution period
    organize signal counts in a matrix by severity (warning, caution, alert, severe)
    for each severity, calculate risk:
      Derive bias:double bias=(double)(biasWeight*(double)count);
      Calculate resolution period severity risk: severityRisk=(severityBias/biasSum);
      Add the resolution period severity risk to the severityRiskSum that maintains total risk per severity.
    for each severity (warning, caution, alert, severe)
      averageSeverityRisk=severityRiskSum/numTerrainsWithNonZeroRisk
      bias the severity risk using severityWeight: biasedSeverityRiskAverage=(severityWeight*severityRiskAverage)
      track the sum of all severity average risks: severityBiasedAverageSum+=biasedSeverityRiskAverage
    for each severity (warning, caution, alert, severe) derive severityBiasedRisk average:
      Derive severityBiasedRisk: severityBiasedRisk=(severityBiasedRiskAverage/severityBiasedAverageSum)
      store the severityBiasedRisk in matrix with severity on Y axis and biased risk on the X axis
    Derive over all Actor risk by summing strong severity biased risk (alert and severe): actorRisk=severityBiasedRisk[alert]+severityBiasedRisk[severe]
    Emit Actor Hazard signal reporting the overall actorRisk store and all details gathered for the resolution period When the process is complete, a series of hazard signals may be emitted by the System, one for each Actor with (at least one) Anomaly signal during the resolution period reporting the derived Actor risk score. These signals may be used as input for the threat detection process.

Threat Detection processing may operate as follows. First, the System identifies the unique list of resolution periods identified in all Hazard signals received as input. A resolution period in the Hazard detection process takes the threat window (24 hours for example) and divides that time window into small chunks of time (for example, six hours). For Threat Detection, the resolution periods found in Actor Hazard signals is identified for use. The following is an example of processing that may occur for Threat Detection:

for each resolution period found in hazard signals
  timePeriodAssetList=retrieve list of assets associated with each hazard signal found during the resolution period
  timePeriodActorHazards=retrieve list of all actors and hazard signals that occurred during the resolution period
  for each asset in timerPeriodAssetList
    assetDerivedRisk=Get the maximum risk value from all actor hazards that reference the asset scaledAssetRisk=assetDerivedRisk*(assetRisk/100)
   if scaledAssetRisk>minimumAssetRiskThreshold generate Asset Threat Signal
for each actor hazard signal
scaledActorRisk=hazardActorRiskScore*(actorRisk/100)
   if scaledActorRisk>minimumAssetRiskThreshold generate ActorThreat signal The cognitive modeling line of features and services is built on the Cognitive Modeler (CM) platform, which consists of a tightly integrated, yet loosely coupled, collection of machine intelligence and advanced computer science subsystems. The underlying technology used in these cognitive modeling features is, in most cases, hidden from the user. This is the case in any cognitive modeling application. From the user's perspective, the feature, as shown in FIG. 3, has three elements.

Figure 3:
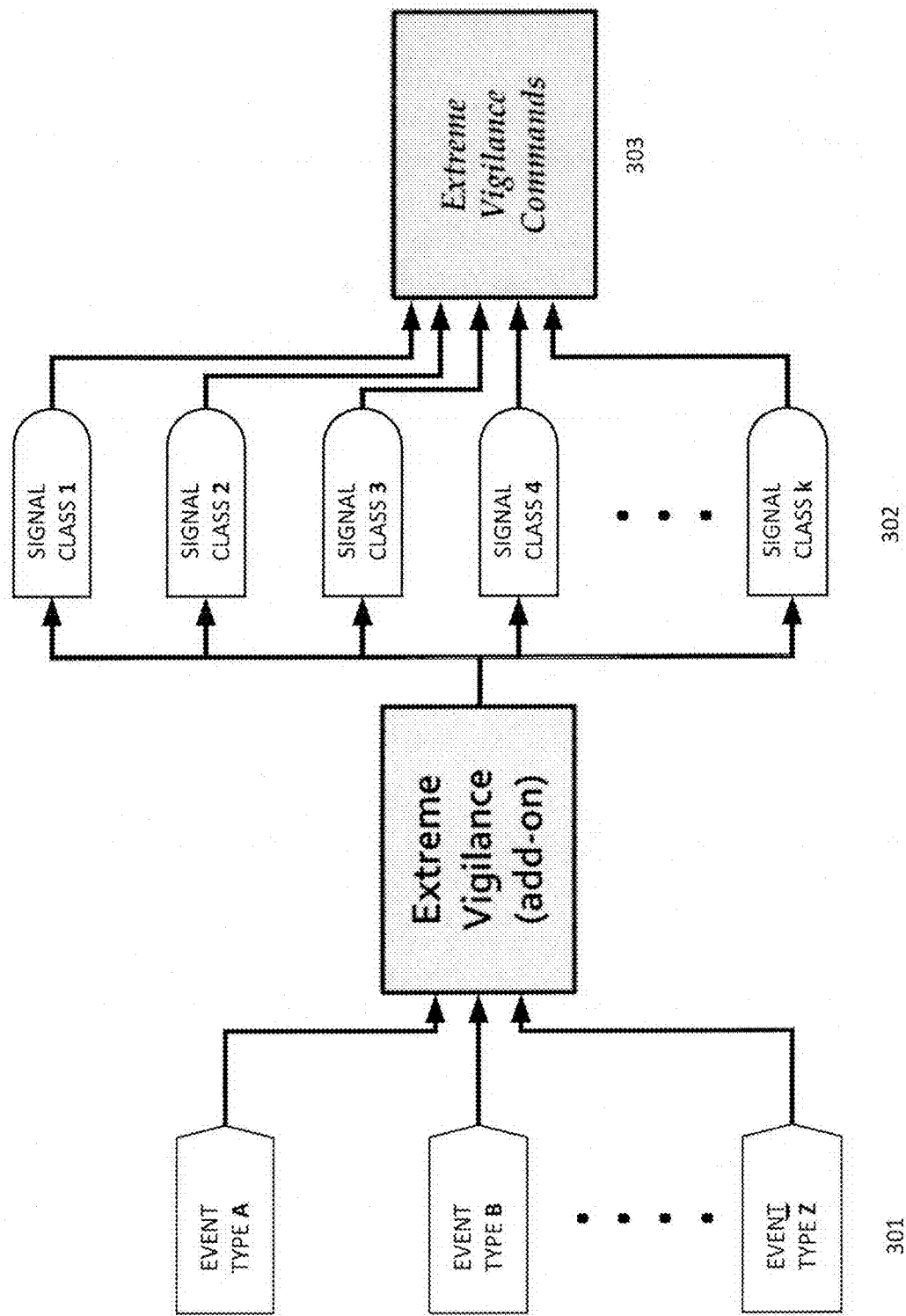
FIG. 3 shows a first high level view of cognitive modeling.

FIG. 3 shows a first high level view of cognitive modeling. In FIG. 3, there are events going into the model at point 301, signals coming out of the model at point 302, and a command language that processes the outgoing signals at point 303. FIG. 3 is illustration is a bit simplified. However, there are also commands that select the incoming events as well as commands that run various phases of the model. But from a client perspective the input-output-analyze relationship is the primary functional sequence. Understanding the role of events and signals in the application is important in understanding the kinds and breadth of information generated by a population of signals at any point in time.

Figure 4:
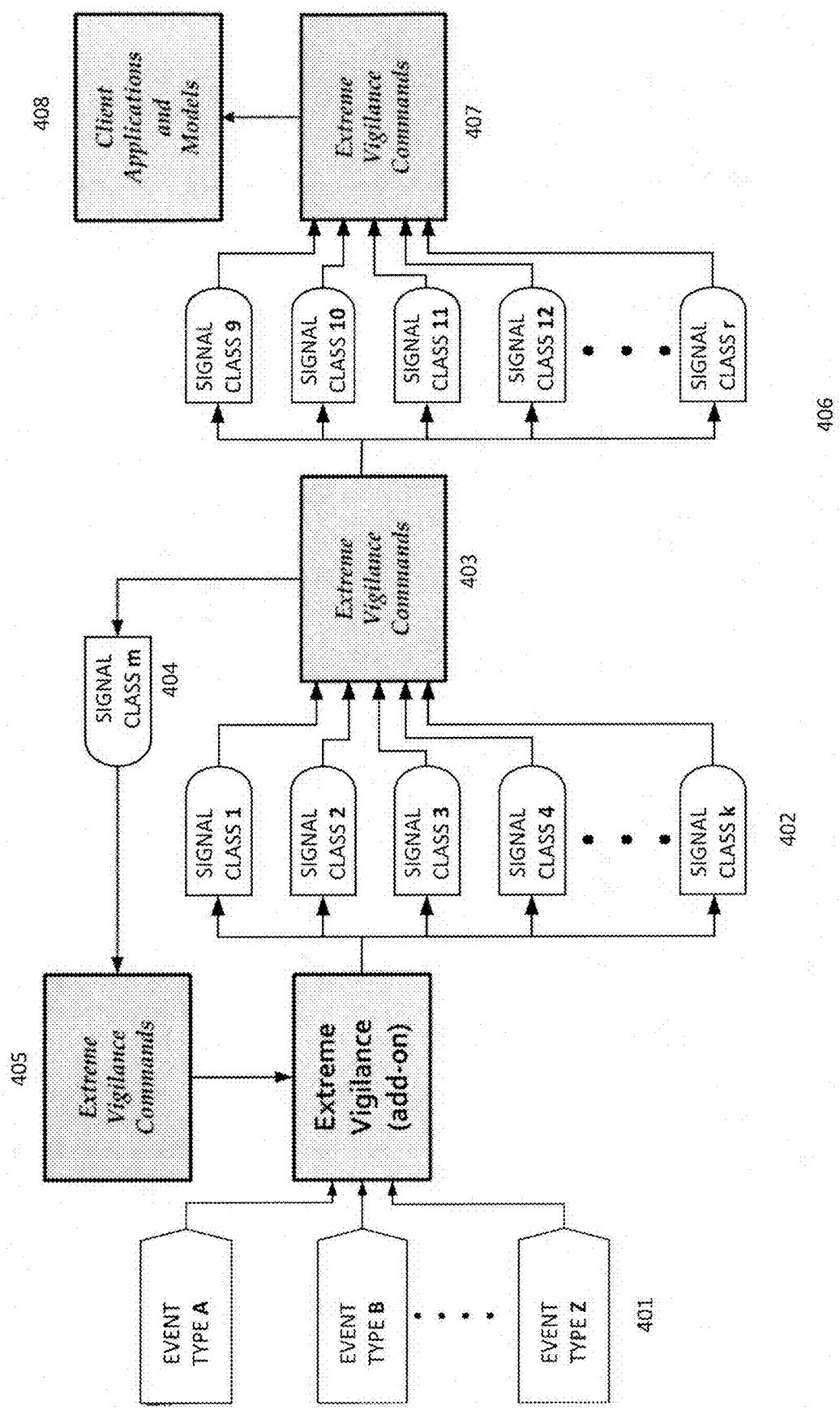
FIG. 4 is a further cognitive modeling high-level overview.

FIG. 4 expands the interplay of signals among feature commands as well into the client's own applications and models. FIG. 4 thus represents a further cognitive modeling high-level overview. From FIG. 4, element 401 represents a stream of events flowing into the cognitive modeling function or application. This is the only point where events enter the System (through, for example, an AcquireEvents( ) command) Subsequent processing involves signals (which may be (but are not necessarily)) transformational representations of one or more events. Element 402 represents cognitive modeling behavior and Action modeling components digest the events. These events are used to initially train the machine learning models and then, when the cognitive modeling model is placed into operation, the events are used to learn a wide variety of unusual behaviors. The detection of an unusual behavior generates one or more signals. Element 403 indicates the signals generated by the behavior models inside cognitive modeling describe the nature of anomalous behaviors relative to normal behaviors. These signals are consumed by a variety of application analytical commands. These commands often combine the information from many signals order over time to generate their own set of signals. From element 404, a few of these signals occasionally form an adaptive or cyclical feedback loop with the core model components.

At point 405, the feedback process generates a set of Actions within the model, which, in turn, produces another set of output signals (element 402). For element 406, for signals that do not form a feedback loop into the behavior models, the cognitive modeling analytical commands which have consumed the behavior model signals, also perform a wide spectrum of analyses and generate their own set of output signals. From element 407, these next generation signals are consumed by other commands further down the "food chain." From element 408, the entire. time-varying signal output from any of the cognitive modeling applications and services are available to the client. These files can be consumed and used by any client processes.

Cognitive Signals are not only used as the backbone for advanced machine reasoning applications, but they provide tools to develop extensions, integrate cognitive modeling with strategic corporate or agency applications, and perform additional machine learning analyses. In general, Cognitive Signals can be used to build vital links between semantic-based machine intelligence services and a common client to obtain more knowledge out of even the most powerful machine learning environment. Hence, Cognitive Signals constitute an audit of all the operations underlying the computing and machine intelligence operations of the applications. Cognitive Signals maintain and expose, in terms of results, the qualitative semantic (fuzzy logic and linguistic variable) nature of our machine intelligence functions (the actual algorithmic processing is not exposed). Signals support the necessary time sequence information for deep root cause analysis (this is how cognitive modeling does root cause discovery and the signals can be used for custom root cause analysis). Signals provide critical information for model performance analysis. Signals support (and for hazards and threats, contribute to) the analysis of information density (trustworthiness). Signals provide the flow of state information between cognitive modeling features and applications. Signals connect components within a cognitive modeling feature or application. Signals support client connectivity between features or applications using semantic rules (rules can emit their own client-configured signals). Signals provide connectivity to other systems, such as for advanced analytics and customer analyses. Signals provide the ability to integrate cognitive modeling applications into external enterprise applications. Signals can be explored using almost any data management or model tool. Signals can be investigated using other machine learning and commercial statistical analysis applications (such as SAS). Signals are used in the model configuration process and in semantic (linguistic variable) optimization.

The stream of signals provides information and insight into what is happening inside the model as well as the results of the analyses performed inside the model. That is, the only things the outside world can know about the functioning of a model are made visible through the signals. This includes GUI interfaces.

Computing Trustworthiness

One question is how to trust the System's behavior modeling analyses and predictions. Fundamental to Cognitive Modelling capabilities is the measurement of trustworthiness. The following discusses the issues with evolving a measure of trust in a model.

The wide-spread and very deep use of fuzzy logic as the underlying epistemological algebra in our cognitive models means that trustworthiness of the models can be assessed based using the degree to which they conform to a set of key performance metrics. The most important metrics are associated with four principles.

The first three, density, volatility, and similarity are scalar values. All three of these values are ultimately measured as elastic tensors (fuzzy set membership values), but the use of similarity (a unique property derived from fuzzy mathematics) removes one dimension of the metric from probabilities, Euclidean distances, and ratios. The fourth principle is periodicity and defines the recurring time-varying patterns of the data over different time horizons. Periodicity accounts for changes in density and volatility of data over different time frames.

The time-varying conventional and fuzzy mathematics used to ultimately derive a trust measurement is too complicated and requires significant knowledge (in fuzzy set theory and information theory) and is beyond the scope of this disclosure. The purpose of this disclosure is to describe the ideas and concepts brought together in order to consistently and reliably compute a trustworthiness value. Like all critical metrics in these models and devices, trust is a value in the range [0,1]. The underlying response curve is sigmoidal (S-shaped) with an inflection point around [0.80]. Since the majority of trust resides in the density and volatility values and similarity and periodicity are rather complex mathematical properties, this overview deals only with Terrain and graph density and volatility.

How can we trust the System's behavior modeling analyses and predictions? Fundamental to the Cognitive Modelling capabilities is the measurement of trustworthiness. This metric is based on the idea of information entropy—that is, the amount of "noise" in the System. In information theory "noise" has several meanings, but we pull together two concepts: density and volatility.

Density is the average information saturation in a Terrain or graph and reflects the idea of potential versus actual data. Density in this context is the fundamental measure of noise. The less data available in Terrains and graphs (and other machine learning structures including clusters and classifiers), the more empty spaces available in the structure that encodes information (and, ultimately, knowledge).

Volatility, as the name implies, is a time-varying property of the data that reflects the rapidity of change in the fundamental statistical properties of the data. In terms of trustworthiness, the System measures both the rate of change (the first derivative over time) and the rate of the rate of change (the second derivative over time). The higher the volatility of the data the higher the potential noise (as measured by a standard error of estimate from one time period to the next).

Hence, noise is the ratio of potential knowledge to actual knowledge scaled by the data's volatility (basically density× volatility). Noise is represented as the metric Su(t) in the System (since it is related to the idea of uncertainty over time in Shannon information theory. As Shannon said in his 1948 paper, "The conditional entropy Hy(x) will, for convenience, be called the equivocation. It measures the average ambiguity of the received signal." This idea of information ambiguity is central to the trusted model measurement.

The Cognitive Modeling platform is built on the concept that the degree of trustworthiness can be measured and displayed in the System's algorithms and (as a consequence) system pattern discoveries and predictions. As noted, trustworthiness is based on a version of information entropy (the ratio of noise to data in the System). In essence, trustworthiness is based on amount of data available in the relevant ecologies versus how much potential data could be available. How the System measures amount of "potential" data available is both important and difficult.

In cognitive modeling, the System seeks to measure trustworthiness across operational dimensions: model, ecology, and classifier. Each dimension is enclosed by a higher level dimension, and thus a model contains a set of ecologies and an ecology contains a set of Actor landscapes, which, in turn, contain the basic machine learning structures (Terrains and Graphs).

The level of noise in Terrains and Graphs introduces ambiguity and inhibits learning, with precision, not only the actual behavior of Actors, but also inhibits ability to learn the active work periods for Actors (both human and machine). The less non-volatile data available in Terrains and Graphs (and other machine learning structures including clusters and classifiers) the more actual or virtual empty spaces are available in the structures that encode information (and, ultimately, knowledge). A virtual empty space is a space with data but whose standard error of estimate (SEE) is higher than the statistical limit version of r.

Terrain trust—One obvious, but simplistic, measure of Terrain density (dT), as an example, is based on a relatively straight-forward weighted average of the amount of data found in a Terrain:

$$d^T = \frac{1}{r \times n} \sum_{i=1}^{n} \sum_{i=1}^{r} T(r, n)$$

Where,
r is the time of day increments in the terrain
n the days over which the density should be computed
T( ) a terrain manifold However, the weighted average amount of data in a Terrain is insufficient in understanding the ratio of actual data to potential data. For this we are concerned with the number of (time of day, day of year) cells on the Terrain that are occupied (regardless of the magnitude of the data) versus the total number of available cells. For this we define a measure Su(t)—the Shannon local information entropy (u) and time (t) for a particular landscape. Su(t) is a better, but still straightforward metric is:

$$S_t^u(L) = \frac{\sum_{n=1}^{K} \exists (T(n) > r)}{\sum_{n=1}^{K} \exists (T(n))} \times T(n),$$

Where,
K the total number of terrains in the landscape
∃( ) for each element in (x); the count of( ) function
T(n) the $n^{th}$ terrain in the system
r the minimum data cell density to qualify as "not empty"
T( )$_v$ the volatility associated with the $n^{th}$ terrain The System uses the local information entropy to easy compute the global information entropy (Du(t)). This is simply:

$$D_t^u = \frac{1}{N} \sum_{i=1}^{N} S_t^u(i)$$

Where,
N is the number of local (landscape) entropy values
$S''_{(t)}$ is the landscape entropy Hence, the simplest global System entropy (trust) is average of the landscape trusts. This can be adjusted based on other factors such as the criticality of the Actor associated with Su(t), the average criticality of the Terrains, the number of Terrains, and the behavior of the Actor relative to the Actor's peer group (which is also affected by the entropy of the collected Terrains across peers). The same calculation is used to compute the global trustworthiness for graphs from the local graph entropy.

With respect to graph trust, like Terrains, a graph settles into a state of operational information density (Su(t)). Like Terrains, if the Actor changes behavior, then the information density of the System (this is still a form of Shannon Information Entropy) changes until it can settle once more in a steady state.

In a collection of Terrains, the System measures local Information Density (Su(t)(L)) by how much of the discovered work area is populated with events (the average Terrain density). If a Terrain is lightly populated, the Terrain lacks enough data to give the machine learning and prediction engines sufficient precision and clarity to make reliable (or effective) decisions.

A graph suffers from the same bias when faced with a lack of information. Information in a graph is reflected in the magnitude of the mean probability binding the nodes. Hence, in a graph the corresponding Information Density is the average inter-node (that is, edge) probability of the entire graph above specific threshold. The following equation (somewhat simplified to exclude probabilistic volatility) shows this:

$$S_t^u = \frac{1}{N}\sum_{i=1}^{N-1}\sum_{j=1}^{K} p(e_{i,j}) - \left(\frac{1}{N-r}\sum_{i=1}^{(N-r)-1}(g(i)\sum_{j=1}^{K} p(e_{i,j}) \geq m\right)$$

Where,
N is the number of nodes in the graph
K is the number of outbound edges for node(i)
P(e) is the probability associated with edge(j) for node(i)
r excluded node count
g(i) is a selector function that chooses the is node that has not been excluded
m an edge's minimum probability threshold for being selected Thus the higher the residual mean probability of the entire graph, the more data underlies the transition states. The parameter m is the minimumIDProbabilityThreshold property and excludes probabilities that are less than this value. A default value may be provided, such as [0.10]. The parameter r is the number of edges excluded because they are below parameter m.

The rationale for this is as follows: this approach first calculates the mean probability on every edge in the graph (call this T). Then the mean probability of every edge that is above a given threshold is calculated, and this value is called r. Then, if m is selected correctly, Δ(T,R) is the actual information density in the graph.

With respect to graph stability and steady-states, when new behaviors are introduced into the graph (hence it becomes a time-varying unbounded system) any steady state will begin to fluctuate. But this steady-state fluctuates around the changes in either the activity on existing nodes or the introduction of new nodes (Taxonomies) or both. Computing Information Density as graph stability decays is therefore beneficial. This is where comparing learned behaviors and new behaviors provides insight into the emergence of new time-varying behaviors (which start as anomalies and then become normal behaviors). As new behaviors reach a steady state, they form the behavior platform from which anomalies in the new data are detected.

With respect to trust semantics, the metric Su(t) or Du(t) will be a value in the range [0,1] and can be treated as a fuzzy compatibility index (CIX). Thus it is associated with a Context (TRUSTWORTHINESS) to provide the application user with a semantic measure of trust (such as, VERY HIGH, HIGH, MEDIUM, LOW, VERY LOW). Through some user interaction or based on the context or some other set of Actors the actual value of density and volatility (as well as their semantic measure) can be or will be displayed.

With respect to trustworthiness, a better way to compute actual information density is based on the probabilistic subset of the Terrain that contains periodic work patterns. That is, information density reflects an Actor's actual working days of the week and hours of the day. Calculating the work-specific or active information density requires determining which days of the week are actual work days for the Actor.

This pattern based information density generates a work pattern array W[dow][p] where the day of week (dow) dimension has a dimension of seven, for example (Monday through Sunday); and the period (p) dimension has a cardinality of P. The first step is completing $W_{t,j}$ for each actor using the terrain history data. The process appears as:

$$W_{P(j)}^t = \sum_{i=0}^{N} t \leftarrow dow(i) \sum_{j=0}^{P} \forall\, (c[]_{i,j} > 0)$$

where:
$W^t_{(j)}$ is the weekday density matrix for the actor
N is the number of days in the terrain
t is the day of week corresponding to the day of the year (N)
dow( ) is a function that returns the day of week number of a given N
P is the number of periods in a day
c[ ]i,j the cell for the ith day and jth period
∀ is the count-when( ) function When complete this will produce an 7×P array for the Actor indicating the count of times a value was detected on a particular day of the week. The count of the number of times may be stored in the period dimension. In order to reduce the occurrence count to an incident pattern, the System normalizes the values:

$$W_{P(i)}^t = \frac{W_{p(i)}}{\max(W_{p0})}$$

That is, the count of the number of cells in the working pattern Terrain subset divided by the maximum cell value in the working pattern Terrain subset. The challenge is to define this rectangular subset of the complete terrain that reflects the probable working times and days of the Actor. Table 1 illustrates a Terrain for an Actor whose work hours and days are non-standard.

TABLE 1

An Actor Terrain

| Time of Day | | | | | | | | | | | |
|---|---|---|---|---|---|---|---|---|---|---|---|
| 2200 | | | | | | | | | | 1 | |
| 2100 | | | 4 | | | | | 5 | | 1 | |
| 2000 | | 8 | | 1 | | 3 | | | | 5 | 2 |
| 1900 | | 14 | 10 | 10 | 13 | 16 | | | 12 | 15 | 34 | 11 |
| 1800 | 16 | 11 | 9 | 14 | 22 | 17 | | | 16 | 22 | 24 | 29 |
| 1700 | | 12 | 15 | 8 | 14 | 19 | | 26 | 10 | 14 | 17 | 19 |
| 1600 | | 1 | 2 | | | | | | 1 | | 8 | |
| 1500 | | 8 | 23 | 21 | 14 | 12 | | | 20 | 31 | 44 | 9 |
| 1400 | | 33 | 11 | 22 | 17 | 13 | | | 10 | 12 | 16 | 21 |

TABLE 1-continued

An Actor Terrain

| Time of Day | | | | | | | | | | | | | |
|---|---|---|---|---|---|---|---|---|---|---|---|---|---|
| 1300 | | 14 | 26 | 18 | 12 | 12 | 12 | | 22 | 12 | 24 | 29 | |
| 1200 | | | 16 | 11 | 19 | 24 | 7 | | 10 | 17 | 14 | 19 | |
| 1100 | | | | 3 | | | | | 1 | | | | |
| 1000 | | | 2 | 1 | | | | | | 3 | 5 | | |
| | 34 | 35 | 36 | 37 | 38 | 39 | 40 | 41 | 42 | 43 | 44 | 45 | 46 |
| | M | T | W | T | F | S | S | M | T | W | T | F | S |
| | | | | | Day of the Week | | | | | | | | |

This Actor works eight hours from noon to 7 pm on Wednesdays through Sundays. He/she takes a lunch or early dinner break at 4 pm. To discover this pattern, we need to understand the surface profile of the Terrain—that is, a Terrain with data is a three dimension surface (the data forming the height).

Step 1. Find probable Work days for an Actor. The System looks for days of the week that have concentrated activity patterns. If the Actor's work week is "crisp" enough then every day that is not a work day will have an activity count of zero. This will probably be mostly the case, but we can sharpen our focus by removing noise or small periodic work events from consideration (this is called "unvoting" the day). This provides PWD (Probabilistic Work Days).

The System uses a reinforcement approach in isolating the work days. The System runs through a deep set of history days, counting the number of nonzero cells in each column (hours of the day). The System accumulates these counts in a probable day of week histogram (W[ ]).

```
Begin: Find Working Days
001    let T[ ][ ] = the terrain
002    let W[0,1,...6] = possible work day
003    let unvoteThreshold = .3
004    For each dayOfYear, d = 1, 2 , 3, ....,m
005       for each periodOfDay, p = 1,2,3, ..., hoursInDay*intervals
006          dow = DOW(dayOfYear)
007          if T[d,p] > 0
008             W[dow] = W[dow] + 1
009          end if
010       end for each periodOfDay
011    end for each dayOfYear
```

The count in the day of week window (W) acts like a vote for this day of week as a working day. To find out if this vote is valid the System determines how strong it is relative to all the other votes. Thus the System measures the ratio the sum of all the votes for a day or week against the day of week with the maximum number of votes:

```
012    maxVote = -1
013    for n = 1 to 7
014       if W[n] > maxVote
015          maxVote = W[n]
016       end if
017    next n
```

The System then computes the ratio and check to see if it is above the unvotethreshold. If so, the System marks the day of week as a work day.

```
018    for n = 1 to 7
019       r = W[n]/maxVote
020       If r > unvoteThreshold
021          WorkDay[m] = true
022       end if
024    bext n
```

Step 2. Find probable Hours of the Day an Actor Works. This is the horizontal analysis to the work day's vertical analysis. The System looks for the hours of the day that have concentrated activity patterns. If the Actor's work hours are "crisp" enough then every hour that is not a work hour will have an activity count of zero. Unlike work day discovery, work hours will generally have a high degree of noise (since people come in early and stay late on a work day, but hardly ever come in on a non-workday). Similar to work day discovery, the System can smooth out or soften focus by removing noise or persistent periodic work events from consideration (this is called "unvoting" the time of day). This yields PWH (Probabilistic Work Hours).

Unlike work days, the boundaries of work hours are not so precisely defined. Work hours a generally quite elastic. It is quite common for people to come in early or stay late to catch up on work, socialize, assist in other projects, and a whole range of other reasons. An effective behavior modeling system must take this imprecision in work hours into account. That is, if a system models a person's hours exactly (find that eight hour window) then that system may miss the fog or foam around the start and end hours that are, for all reasonable purposes, an integral part of the person's work day. To model the near outliers on a work day, the present System lowers the unvotethreshold to a lower number between 0 and 1, such as 0.15 or 0.20.

When the System has identified the Actor's day of the week work days and the Actor's hour of the day work times, the System has reduced a Terrain to the core information region (IR). It is this region (see Table 2) used to calculate information density. The System also uses this region to compute native or organic thresholds,

TABLE 2

The core Information Region

| Time of Day | | | | | | | | | |
|---|---|---|---|---|---|---|---|---|---|
| 1900 | 14 | 10 | 10 | 13 | 16 | 12 | 15 | 34 | 11 |
| 1800 | 11 | 9 | 14 | 22 | 17 | 16 | 22 | 24 | 29 |
| 1700 | 12 | 15 | 8 | 14 | 19 | 10 | 14 | 17 | 19 |
| 1600 | 1 | 2 | | | | 1 | | 8 | |
| 1500 | 8 | 23 | 21 | 14 | 12 | 20 | 31 | 44 | 9 |
| 1400 | 33 | 11 | 22 | 17 | 13 | 10 | 12 | 16 | 21 |
| 1300 | 26 | 18 | 12 | 12 | 12 | 22 | 12 | 24 | 29 |
| 1200 | 16 | 11 | 19 | 24 | 7 | 10 | 17 | 14 | 19 |
| | 36 | 37 | 38 | 39 | 40 | 43 | 44 | 45 | 46 |
| | W | T | F | S | S | W | T | F | S |

The core information region adequately represents any kind of Actor. As an example, a server (machine) can run 24 hours a day seven days a week so its IR could possibly be the entire Terrain. A point of sales machine might run only when the associated retain store in open (16 hours a day). But the same subset IR identification algorithm will likely work for every case.

The idea of information density and Shannon Entropy is critical to machines making decisions based on different degrees of evidence. If a client does not have enough information in their landscapes and ecologies, then the behavior modeling mechanisms cannot make accurate classifications and predictions. Information density is assessed in signals derived from Thresholds and Graphs (which have their own form of information). This ID measurement is employed to calculate trustworthiness and reliability metrics all the up the anomaly to threat chain of custody path.
Trust Processing

```
001   begin DiscoverActiveRegions
001     let Hd = history depth for active terrain region
001     set Hd = property.historydepth
001     for each actor class, C_k = c1, c2, c3, ..., cR
003       for each actor, A_j = a1, a2, a3, ..., aM
001         for each terrain, T_i = t1, t2, t3, ...,tN
002           discover active (work) region for T_i using Hd
002             see: Step 1. Find probable Work days for an Actor
003             see: Step 2. Find probable Hours of the Day an Actor
                  Works
003           store results in W▯▯ for terrain T_i
003         end for each terrain
004       end for each actor
005     for each class
006   end DiscoverActiveRegions
```

Having the work region for each Terrain associated with an Actor in a specific actor class, the System can compute amount of overage in the work area as the ratio of actual coverage to potential coverage. This is the landscape trust.

```
001   begin Compute Over-all Actor Trust
002     for each terrain, Ti = t1, t2, t3, ..., tN
003       compute terrain densityRatio (dr) based on:
004         active region data, active region capacity
```

$$d_r = \frac{\forall\, c_{wr}[][] > 0}{\forall\, c_{wr}}$$

```
005       store with terrain Ti
006     end for each Terrain
007     compute average dr
008     return wgtdavg(dr) as actor trust
009   end Compute Over-all Actor Trust
```

Instead of a normal statistical mean, the trust metric can be responsive to the importance of the Terrain using, for example, a weighted average. A weighted average captures the idea of biasing the trust based on the coverage of critical terrains (or even critical Actors). Such a trust metric related weighted average is computed by:

$$\bar{d}_r = \frac{\sum_{i=1}^{N} dr_i \times T_i^w}{\sum_{i=1}^{N} T_i^w}$$

where $T^w_{(i)}$ is the criticality weight (or other categorical or semantic weight) associated with the current Terrain. In this way trustworthiness incorporates the idea that some Terrains need a higher degree of data coverage than others.

The trustworthiness of a model may be the weighted average of the landscape $d_r$ averages (that is, Actor trustworthiness) for each of the Actors in each of the Actor categories. In this way the System can also assign a weight to each of the Actors, identifying Actors having a higher degree of criticality or cost or intrinsic instability (such as newly hired Actors, regardless of their Terrain coverage).

Compute Servers

The device operating the concepts disclosed herein is a compute server arrangement. Compute servers are hardware employed to perform specific functionality in this realm, primarily to address the problem of how to analyze a "perceived infinite" amount of data to better understand the behavior of the critical resources of the environment. Thus the servers used to compute the behaviors and concepts enclosed include hardware and software for scaling algorithms across an actor population. The system employs a series of knowledge nodes, where the compute server arrangement performs multi-pass analysis as part of the overall process. The system employs mesh computing, and processing on the system is driven by a supervisory node. Overall, the analysis performed by the supervisory node and the knowledge nodes is driven by a taxonomic normalization of the data, where the data is exceedingly large or seemingly infinite.

The compute servers perform four general functions, including normalize, migrate, supervise, and analyze, in order to scale the performance of multiple disjoint algorithms across an actor population. The compute servers normalize data using a common taxonomy, distribute normalized data across at least one but typically many knowledge nodes, supervise the execution of algorithms across knowledge nodes, and collate and present results of all analyses. Normalization performed by the compute servers is to provide data according to a common collection of fields. The collection of fields may be driven by data or driven by the information sought, i.e. established a priori.

Multiple knowledge nodes may be provided, and in typical cases actors are distributed as evenly as possible between the knowledge nodes. Knowledge nodes are set up as a web, with an ability to obtain and/or share data between knowledge nodes. With respect to the common collection of fields, these are represented by a taxonomy, representing a common language understood by all knowledge nodes such that data can be shared between nodes. And again, a supervisory node manages the knowledge nodes.

More formally, taxonomy is the science of naming, describing and classifying objects. In this instance, an object represents information (either an event, a state change or other piece of knowledge). The present system employs a particular taxonomy as follows:

Actor|Action|Process|Field|Value|Reference Key|Source Asset|Destination Asset

An individual entry (a collection of one value for each field in the taxonomy) is called a row. Most of these fields are flexible in terms of what they represent. In general, an Actor performs an Action via a Process whose results are located or placed in a Field containing a Value. The Action performed by the Actor may come from a Source Asset and may be applied to a Destination Asset. The Reference Key contains a value that ties a present Row to other Rows, thereby providing a method for combining the results of separate Row analysis if necessary.

The Actor is the resource being analyzed. A Data Dictionary is the mapping between information, usually events, and at least one taxonomy. A Cognitive Mode is a collection of Data Dictionaries. A Knowledge Node is a combination of a data store and a compute resource for running analyses. Knowledge Nodes are connected in a mesh fashion, i.e. each Knowledge Node can connect to every other Knowledge Node to extract data and execute commands. This mesh is known as a Knowledge Web.

The Knowledge Web is the collection of Knowledge Nodes connected in a web fashion, where the Supervisor or Supervisor Node controls the Knowledge Web. The Supervisor provides instructions on what to do to each Knowledge Node, when to do a task or action, and where to return the results from the task or action(s). The Supervisor collates the results of any actions in a Knowledge Web and stores and/or displays these results as desired or necessary.

Order of execution is as follows: Normalization, Distribution, Supervision, and/or Presentation. With respect to Normalization, the system executes a command to extract/acquire information from a data store as specified in the Data Dictionary entries in a Cognitive Model over some time period. The system then maps this information to the corresponding fields in the Taxonomy.

Distribution comprises randomly distributing the taxonomies of information to one of the available Knowledge Nodes, which then stores the Row. The Supervisor node and/or at least one Knowledge Node knows the location of the Row, i.e. Row 10489330 is on Knowledge Node Omicron. Supervision entails the Supervisor node coordinating analyses, either in a scheduled or ad-hoc fashion. Presentation entails the Supervisor node collating results so the results may be presented in a manner appropriate for a specific user.

An example of this arrangement is a so-called "supermarket-to-table" example, where a seemingly infinite amount of food is available in a seemingly infinite number of supermarkets and able to be assembled using a seemingly infinite number of recipes for a seemingly infinite number of people, with the goal of the system is to provide assembled meals to a number of persons, perhaps in the thousands. With shipping available and economically feasible in certain situations, the number of possible supermarket sources or resources is exceedingly large and apparently infinite. Also, with variations available to any combination of ingredients, the number of recipes is also seemingly infinite. In this example, a knowledge node may be geographically oriented, i.e. addressing a certain number of diners in a region, wherein the supervisory node task is to provide an assembled meal at a meal time for a group of people, in this example within the geographic region. A data store may include significant information about the diners in question and the supermarkets and recipes available, and such information may be normalized. Information may include diner preferences, allergies, persons dining together, location of dining, and other information. As an example, persons may have provided this information to the data store, such as using the internet to answer a questionnaire. Fields are mapped to the taxonomy, which may include Actor|Action-|Process|Field|Value|Reference Key|Source Asset|Destination Asset, here the Actor being the diner or the supermarket, Action being, for example, cost of delivery of an item, Process the process for actuating the item (order/payment/retrieval by diner), Field, Value, and Reference Keys representing administrative values for the particular row, and Source Asset and Destination Asset being the source product (tomatoes) and the destination asset (fully assembled dinner from a desired recipe at the Actor's chosen location on Sunday July 13). Again, these are examples and other values or fields may be provided, and taxonomies may differ.

Following Normalization, Distribution comprises distributing the taxonomies of information to one of the available Knowledge Nodes, which then stores the Row including the taxonomy of the tomatoes in the example outlined above. The Supervisor node and/or at least one Knowledge Node knows the location of the Row. Supervision entails the Supervisor node coordinating analyses, either in a scheduled or ad-hoc fashion, such as analyzing the best food selection and the least expensive meal for the given diner given his or her criteria. Presentation entails the Supervisor node collating results so the results may be presented in a manner appropriate for a specific user, such as an email to the supermarket and the diner, contemplating payment and collection by the user of the ingredients from the particular supermarket on a given day.

An alternate version of this "supermarket" situation in accordance with the present design centers around the idea that a supermarket may provide a perceived infinite amount and combination of ingredients. The problem is how to provide meals given such an available supply. The issue may be more broadly stated as, given a perceived infinite amount of food from a perceived infinite number of suppliers, how can meals be provided? To solve such a problem, the present system undertakes Normalization, representing a standard form for all recipes, Analysis comprising analyzing all provisions from all suppliers to select the "best" available ingredients for each recipe, and multiple analyses of ingredients (price, delivery time, quality, and so forth) to come up with a perceived optimal combination based on circumstances. The present system also includes Migration, delivering ingredients to the proper location(s) so the meal can be created, and Supervision, supervising preparation of the meal in an appealing fashion.

Relevancy Engine

The concept of Relevancy in this context couples Conceptual and Semantic (fuzzy) Rules with a bottom up (as well as top-down), weighted dependency graph to isolate, prioritize, and quantify anomalous states in a wide spectrum of business and technical lines of business. The idea underlying Relevancy is to combine general and domain-specific knowledge specified by subject matter experts (in the form of rules) as well as rules discovered from data mining and real-time (or near real-time) event analysis. These rules absorb the current state of the "world" (the state of the model) and, executing together, identify a wide spectrum of anomalous (and often time-varying) behaviors. The combined degree of anomaly generated by the rules affect the weight on the dependency graph.

Figure 7:
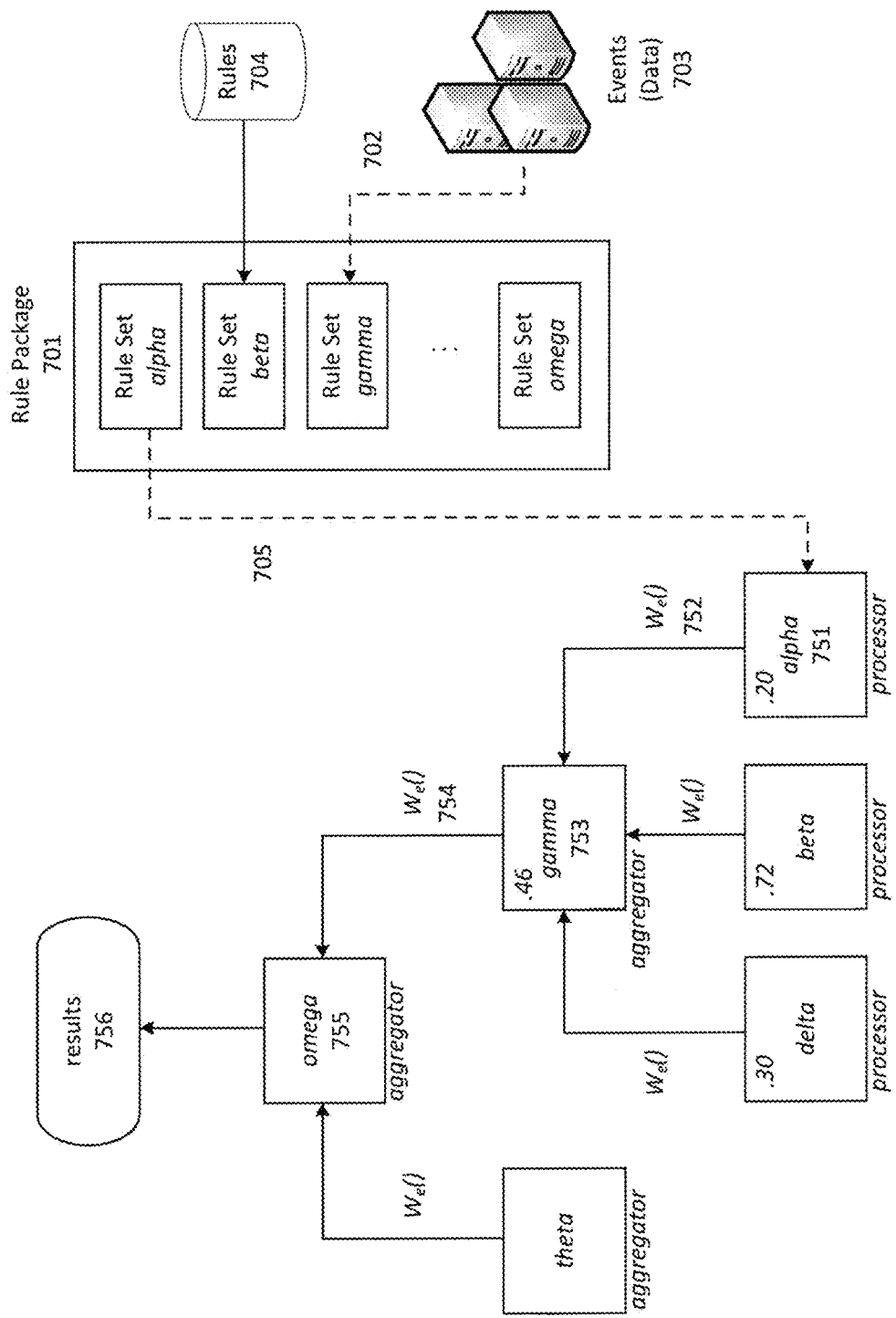
FIG. 7 is a high level functional overview of a relevancy engine connecting rules with a weighted relevancy graph.

FIG. 7 provides a graphical overview of how the rules and the weighted relevancy graph are connected in the present system. Elements 701-705 represent elements of the rule based knowledge backbone, while elements 751-756 define the flow of processing and control through the associated graph.

The two major functional components of the Relevancy Engine are the knowledge base system that houses the set of semantic rules and the relevancy graph itself that propagates the results of the rule execution so that a weighted effect assessment can be made at the top levels of the graph. These two functional components work more or less independently so that the relevancy knowledge can change without affecting the mechanics of the graph. In this way, as an example, the system can create and explore multiple relevancy policies (rule packages) with, in certain instances, different rules from conflicting or competing subject matter experts.

The Rule (Knowledge) Component includes elements 701 through 705 in FIG. 7. Rule Package 701 is a structured assembly of rules. Rule Package 701 allows a collection of rules to be organized into a logically or thematically organized container. Although not required, by default the name of the rule package may also be the name of relevancy graph.

Rule Set 702 is a collection of fuzzy rules. A Rule Set is associated with a node in the relevancy graph. The system executed rules in the Rule Set as a group. The system normally executes the rules in order, but they can also be executed according to the logic of an inference engine (which establishes an ordering agenda based on the continuing state of the system. An agenda acts as a probabilistic selection mechanism in the same way as a Markov model acts as a probabilistic path selector in a graph.)

Event Data 703 represents data from or for an event. The system initiates a Rule Set in response to the arrival of data. This data is usually (but not necessarily) in the form of events. Events are described in a corresponding data model. That is, for event A, the data model defines the type of event, its organization, and the characteristic of each data element (field) in the event. Relevancy analysis can use both events as a standalone object as well as the individual fields contained in an event (that is, as an example, the count of events on or during a particular time, or the inter-arrival time of events, or the clustering of events at a particular time, to give just a few examples, could be important pieces of knowledge, independent of the values of the individual fields.)

Rules are shown as rules 704. A basic rule is in the form: —when state—. The state in this instance is a fuzzy semantic proposition in the general form data element name is [not] [hedges] semantic name. As an example, consider the following simple rules:

when network_traffic is high
when network_traffic is very high
when network_traffic is not very high
when network_traffic is not somewhat very high Rules can also contain structural discriminators that allow the knowledge engineer to fashion rules that deal with information instead of data. As an example:

when emails_sent count(hour) by actor is low

Using this instruction, the system can examine the volume of emails sent by an Actor for each hour in the Actor's statistically determined work period to determine if the "emails sent" volume is low. The system can also examine the intrinsic semantic nature of the data or information values over the current data stream. For example:

when network_traffic is often very high

This rule measures the degree to which a percentage of the network traffic values are considered very high. The system can base rules on a population of values that share a common semantic classification.

A relevancy rule generates a Compatibility Index (CIX), discussed above; this value is generated by an evaluation of the rule's premise state. This CIX measures the degree to which the premise is true (and is a real number in the range [0,1] inclusive). The system interprets this degree of truth as "how compatible is the state to the cumulative average compatibility index from all the executed rules becomes the effect contribution (EC) of the rule set. "Cumulative" means that the rules are executed as though they were connected by an intersection (and) operator. The system may store this EC value in the relevancy graph node associated with the rule set.

Additional rule or graph capabilities associated with the relevancy engine may be provided. The Cognitive Modeler platform may also employ various rules or instructions. The Cognitive Modeler has extensive rule, graphical, and fuzzy semantic capabilities forming a foundation for aspects of the relevancy engine.

Rule-to-Node Connector 705 connects rules to nodes. As previously indicated, each rule set is associated with a node in the relevancy graph. Once this connection is completed, the system initiates relevancy engine processing by looping through the Rule Package 701.

Nodes in the relevancy graph are of two types: processor and aggregator. A processor node has an associated rule set in the rule package. An aggregator node is a parent to both processor as well as other aggregator nodes. The aggregator "absorbs" effect contributions from each of its children.

The purpose of the effect analysis graph is simply to transport weighted effect values from the nodes associated with rules (processors), up through collections of evaluation (aggregator) nodes, weighting each aggregate effect value by a weight assigned to the edge. At the top level of the graph is a weighted effect for the semantic nature of the top node sets.

Processor 751, or Relevancy Processor Node 751, has an effect assessment contribution set by the collection of rules in the associated rule set. The assessment contribution set is the average of the compatibility index values (known as effect contributions) for each of the rules.

Relevancy Edge 752 connects a node further down on the graph with a node further up on the graph. The edge contains an assigned weight used to compute the weighted average of the effects from all the node's children. Aggregator Node 753 absorbs all the effect values (e) from its children nodes. The weights of the incoming edges that connect each child node to its aggregator node are used to compute the weighted value for the aggregator node. The value is:

$$c^e = \frac{\sum_{i=1}^{N} w_i \times e_i}{\sum_{i=1}^{N} w_i}$$

where:
$c^e$ the weighted combined effect
N the number of incoming edges
$w_i$ the weight on the $i^{th}$ incoming edge
$e_i$ the effect from the $i^{th}$ incoming node This weighting is applied at each aggregator node to generate a weighted effect contribution. Weights can be any value in the range [0,100]. Since the effects are CIX values, the weighted value will fall in the same range as CIX values [0,1]. From FIG. 7, the numbers in the corners of the processor or aggregator boxes, such as 0.30 in the delta processor box, represent estimated vales in that processor for a particular item, such as a particular Actor or particular action. These values may be combined using further weightings and made available and/or processed by the aggregator node.

Point 754 represents the Weighted Effect Value, where once a weighted value is calculated for a set of children nodes, the parent node passes this weighted value up to its own parent. Point 755 is the Top Aggregator Node. The movement up the graph continues from processors to aggregators until the upward flow reaches a node with no parent. This is the relevancy state for the entire graph.

Results Signals 756 are the result of the relevancy engine, representing the weighted effect value from the top node (or possibly the top set of nodes). The result is generated in the form of one or more cognitive signals.

Modeling the Statistical Behavior of Statistical Objects

The present design also includes modeling the statistical behavior of statistical objects. The system discovers, models, and predicts the behavior of a resource by comparing its behavior to one or more collections of statistical resources. A statistical resource (called a Behavior Cluster) captures the behaviors of a large numbers of actors that behave in roughly the same way over roughly the same time periods.

The system may create Behavior Clusters through machine learning processes, e.g. fuzzy clustering and/or probabilistic graph theory. Behavior Clusters are used to predict the probable behavior of a new actor through the application of advanced machine intelligence capabilities (fuzzy set theory, fuzzy similarity mapping, nonlinear regression, as well as linear and nonlinear correlation.)

For the modeling function, the following definitions are applicable. Resources, often called actors or (less commonly) affecters, include, as an example, such things as people, computing technology machines and devices, networks, autonomous and connected machines, vehicles, aircraft, containers, railroads, ships, power plants, homes and businesses, drones, satellites, robots, space craft, and meters. Actors can also include less physical entities such as a wide range of electronic documents, independent and connected computer systems, web sites, autonomous intelligent agents, as well as unknown buyers and web site visitors in areas such as ecommerce.

The Modeling Ecology is the environment in which the behavior occurs. As an example, assume an Actor is Bill Smith. Bill Smith is a subscribed member of Mega Gadget's online shopping store. When he visits the Mega Gadget site, the Behavior Clusters to be accessed reside in the mega gadget website ecology. When Bill Smith is roaming around in his smart home, controlling the lights, thermostats, and so forth, the Behavior Cluster to be accessed resides in his resident smart home ecology. The house itself is a member of similar houses in a wide autonomous smart home ecology. When Bill Smith is in his driverless (autonomous) car, the Behavior Clusters to be accessed reside in his passenger smart car ecology. The vehicle itself may reside in a wider autonomous smart car ecology.

The Direction(s) of Actions Graphs are very similar to order of operations graphs used to model the time-ordered actions of a resource in the Extreme Vigilance Behavior application. Both are dynamically discovered Markov graphs. Where the order of operations graph develops a probabilistic model of a single actor's actions by day of week and time of day, the Direction of Actions Graph develops a probabilistic model of the actions of a very large number of actors (by time periods). Thus the edge probabilities reflect the probability that an Actor (either known or unknown) will transition from node X to node Y (as an example, from an HTML page in site R to another HTML page in site R). The system uses the evolution of paths in a Direction of Actions graph to identify the behavior of an unknown Actor.

Behavior Clusters define the statistical actions of a very large number of individual Actors over a time period. A cluster is multi-dimensional. That is, a cluster can discover and represent a behavior such as (in ecommerce) page dwell-time by items selected by checkout value (in dollars). A single behavior can be shared by multiple clusters (one cluster's dwell-time can be SHORT, another cluster's dwell-time can be MODERATE, and another cluster's dwell-time can be LONG, for example). Because clusters use qualitative semantics (fuzzy logic) to encode their behaviors, clusters do not have unique behaviors. That is, some range of SHORT values will overlap some range of MODERATE values (but to different complementary degrees). Hence a resource can belong to (be mapped to) multiple Behavior Clusters. The system can then model the real-world situation where actor behaviors are imprecise, roughly repeated, and sometimes ambiguous. This nonexclusive property also has implications for the precision and accuracy of the real-world modeling of a wide spectrum of Actors.

With respect to specific modeling and prediction in the present design, behavior analysis calls for discovering, quantifying, and modeling the behavior of a collection of individual Actors that share, to some degree, a common set of features. These features may be considered the semantics of the behavior. Rather than following the behavior of an individual Actor (a person, a server, a machine, and so forth), the system considers a cluster of Actors that share the same behaviors as the Actor. Hence (as a few examples) in e-commerce, swarms of machines (such as smart energy meters), advertising campaigns, tactical and strategic troop and weapons deployments, and so forth, individual Actors are replaced by their surrogate, the cluster of buyers, meters, television viewers, and combat infantry battalions that share a common behavior over a common set of features or properties. We call this the statistical modeling of statistical objects.

Assigning an individual Actor to one or more Behavior Clusters allows the system to predict the behavior of an Actor relative to its peers (or identify and quantify unusual behaviors for both known as well as unknown Actors).

For known Actors (such as returning shoppers to Mega Gadget) we can find their behaviors in the shopping ecology through their sign-on identity.

For unknown (anonymous) actors, the system needs to map their path through the web site while continuously matching this unfolding path to the statistical paths (in the Direction of Actions graphs) stored in any of the ecologies. Unknown Actors that do not complete a well-defined path create a partial path which is also stored in the ecology (partial paths are important, they often isolate roadblocks, as an example, to effective shopping or conversion).

Thus in general, the present design may be considered as follows. In a first aspect, the design includes a system for measuring values qualitatively across multiple dimensions (terrain) using cognitive computing techniques. Event reception components, for each field element in each event in a stream, comprise or perform the following functions or functional components: threshold application, terrain updater, outlier analysis module, threshold violation predictor, time-ordered behavior evaluator, and graph updater.

In a second aspect, the design includes a system for detecting and adjusting qualitative contexts across multiple dimensions for multiple actors with cognitive computing techniques. Periodic execution components operate over full or partial sets of received data, including a peer to peer analyzer, an actor correlation analyzer, an actor behavior analyzer, a rate of change predictor, a semantic rule analyzer, and a plurality of signal managers.

In a third aspect, there is provided a system for "defuzzification" of multiple qualitative signals into human-centric threat notifications using cognitive computing techniques. The design may include signal generation components, a system which evolves understanding of anomalies and risks into a human-facing threat indication(s). The system may be based on the described components that detects and signals anomalies. The system generates an anomaly signal by detecting behavior that is inconsistent with normal behavior. An anomaly has two important properties: its severity and its degree of inconsistency (or mathematical distance) from normal behavior. The severity is a class of anomaly (warning, caution, alert, and severe) assigned by the analytical component that detected and measured the anomaly. Alternatively or additionally, the system may be based on the components described herein that detect and signal hazards. A hazard is an unperfected threat associated with an actor without regard to any related assets or the behavior of other actors. It represents the risk to an enterprise based solely on cumulative multi-dimensional behaviors (that is, anomalous states generated from thresholds, orders of operation (AOO), peer-to-peer similarity, and the actor's behavior change over time). A Hazard may have two important properties: severity and weighted risk. A hazard can have a severity of medium, elevated, or high. The severity is not assigned by the system, but is derived by the system from the collection of inherent terrain risks.

Additionally or alternately, the system may include the components described herein and may detect and signal threats. A threat may be a "perfected" threat that ties together actors with the behaviors of other actors as well as the assets used by all the actors in the hazard collection. Threats may develop a sequence of operations over a dynamic timeframe. Threats may be connected in a heterogeneous graph where nodes can be actors or assets and the edges define the frame as well as the strength of their connection as a function of risk. The system may produce incidents that may be reviewed by reviewers.

Additionally or alternately, the system may dispatch cognitive computing across multiple workers. Load distribution components may include a supervisory node dispatching work to a plurality of interconnected knowledge nodes called compute servers. The supervisory node may categorize and scale performance of multiple disjoint algorithms across a seemingly infinite actor population, normalize data using a common taxonomy, distribute normalized data relatively evenly across the plurality of knowledge nodes, supervise algorithm execution across knowledge nodes, and collate and present results of analysis of the seemingly infinite actor population.

At least one knowledge node may comprise a relevancy engine. Construction of such a relevancy engine may include a rule package and a series of processors organized in a tree arrangement configured to perform functions according to the rule set wherein the topmost processor in the tree structure provides results of analysis using fuzzy logic and the rule package organizes a series of rule sets, each rule set corresponding to a different one of the series of processors.

Thus according to one aspect of the present design, there is provided a cognitive system process executable on a computing device, comprising receiving a set of actors and associated actor information, receiving assets and their associated asset information, creating data dictionary entries for at least one taxonomy based on the set of actors and the assets, creating at least one cognitive model using the data dictionary entries for a time period, computing trust of the cognitive model as a fuzzy number, activating the cognitive model if trust of the cognitive model is above a cognitive model trust threshold, when the cognitive model is activated, scheduling a collection of tasks to run that perform regular extraction of actions from an original data source and performing at least one anomaly analysis associated with the cognitive model, for selected data dictionary entries, normalizing associated actor actions by converting at least one event to data dictionary format, inserting at least one normalized terrain entry into the cognitive model, and updating the cognitive model.

According to a further aspect of the present design, there is provided a system for performing cognitive modeling comprising a plurality of components repeated for each field in an event configured to receive data elements, the plurality of components comprising a threshold application component, a terrain updater, an outlier analysis module, a threshold violation predictor, a time-ordered behavior evaluator, and a graph updater, a periodic set of components configured to operate periodically, comprising a peer to peer analyzer, an actor correlation analyzer, an actor behavior analyzer, a rate of change predictor, and a semantic rule analyzer, and a plurality of signal managers. The plurality of components and the periodic set of components are configured to interface with a threat detector.

According to another aspect of the present design, there is provided a series of interconnected compute servers comprising a supervisory node and a plurality of knowledge nodes, wherein the series of compute servers are configured to categorize and scale performance of multiple disjoint algorithms across a seemingly infinite actor population, wherein the series of interconnected compute servers are configured to normalize data using a common taxonomy, distribute normalized data relatively evenly across the plurality of knowledge nodes, supervise algorithm execution across knowledge nodes, and collate and present results of analysis of the seemingly infinite actor population. At least one knowledge node comprises a relevancy engine comprising a rule package and a series of processors organized in a tree arrangement and configured to perform functions according to the rule set; wherein the topmost processor in the tree structure provides results of analysis using fuzzy logic, wherein the rule package comprises set comprises a series of rule sets, each rule set corresponding to a different one of the series of processors.

According to a further aspect of the present design, there is provided a cognitive system comprising a receiver configured to receive a set of actors and associated actor information and receive assets and their associated asset information, a creation apparatus configured to create data dictionary entries for a taxonomy based on the set of actors and the assets and create a cognitive model using the data dictionary entries for a time period, and a computing apparatus configured to compute trust of the cognitive model as a fuzzy number and activate the cognitive model if trust of the cognitive model is above a cognitive model trust threshold. When the cognitive model is activated, the cognitive modeling system is configured to schedule a collection of tasks to run that perform regular extraction of actions from an original data source and perform at least one anomaly analysis associated with the cognitive model. For selected data dictionary entries, the cognitive modeling system is configured to normalize associated actor actions by converting at least one event to data dictionary format, insert at least one normalized terrain entry into the cognitive model, and update the cognitive model.

According to a further aspect of the present design, there is provided a cognitive modeling system comprising a receiver configured to receive a set of actors, associated actor information, assets, and associated asset information, a creation apparatus configured to create data dictionary entries for a taxonomy based on the set of actors and the assets and create a cognitive model using the data dictionary entries applicable to a time period, and a computing apparatus configured to compute trust of the cognitive model as a fuzzy number and activate the cognitive model if trust of the cognitive model is above a cognitive model trust threshold.

According to a further aspect of the present design, there is provided a cognitive modeling method comprising receiving at a hardware computing arrangement, comprising a number of processor nodes and a number of aggregator nodes, a set of actors, associated actor information, assets, and associated asset information, creating data dictionary entries for a taxonomy based on the set of actors and the assets, creating a cognitive model using the data dictionary entries for a time period, computing trust of the cognitive model as a fuzzy number, activating the cognitive model if trust of the cognitive model is above a cognitive model trust threshold, when the cognitive model is activated, scheduling a collection of tasks to run that perform regular extraction of actions from an original data source and perform at least one anomaly analysis associated with the cognitive model. For selected data dictionary entries, the method further comprises normalizing associated actor actions by converting at least one event to data dictionary format, inserting at least one normalized terrain entry into the cognitive model, and updating the cognitive model.

According to a further aspect of the present design, there is provided a system for performing cognitive modeling, comprising an event acquirer configured to acquire an event comprising an associated date and set of data fields, an analyzer element comprising a plurality of components repeated for each field in an event received from the event acquirer, wherein the analyzer element applies thresholds to each event, determines outliers, evaluates time-ordered behavior, and predicts threshold violations for the event, a periodic set of components configured to operate periodically on demand, the periodic set of components configured to perform peer to peer analysis, actor correlation analysis, actor behavior analysis, semantic rule analysis, and predict rates of change, and a plurality of signal managers interfacing with the analyzer element and the periodic set of components configured to exclude signals based on content properties of data transmitted. The plurality of components and the periodic set of components are configured to interface with a threat detector.

According to a further aspect of the present design, there is provided a system for performing cognitive modeling, comprising an event acquirer configured to acquire an event comprising an associated date and set of data fields, an analyzer element comprising a plurality of components repeated for each field in an event received from the event acquirer, a periodic set of components configured to operate periodically on demand to analyze and predict based on information received from the analyzer element, and a plurality of signal managers interfacing with the analyzer element and the periodic set of components, wherein the periodic set of components is configured to exclude signals based on content properties of data transmitted. The plurality of components and the periodic set of components are configured to interface with a threat detector.

According to a further aspect of the present design, there is provided a cognitive modeling apparatus, comprising an event acquirer, an updating and evaluating arrangement comprising hardware configured to apply thresholds, update event related data, predict thresholds and determine outliers from events received from the event acquirer, and a periodic/on demand apparatus configured to analyze event data on demand, and a series of signal managers comprising a first signal manager connected to the updating and evaluation arrangement and a second signal manager connected to the periodic/on demand apparatus. The series of signal managers are configured to exclude signals based on content properties.

According to a further aspect of the present design, there is provided a system comprising a series of interconnected compute servers comprising a supervisory hardware node and a plurality of knowledge hardware nodes, wherein the series of interconnected compute servers are configured to categorize and scale performance of multiple disjoint algorithms across a seemingly infinite actor population, wherein the series of interconnected compute servers are configured to normalize data using a common taxonomy, distribute normalized data relatively evenly across the plurality of knowledge hardware nodes, supervise algorithm execution across knowledge hardware nodes, and collate and present results of analysis of the seemingly infinite actor population.

According to a further aspect of the present design, there is provided a system comprising a knowledge base system comprising a rule package comprising a plurality of rule sets, and a relevancy processor arrangement comprising a series of processors organized in a tree arrangement and configured to perform functions according to at least one of the plurality of rule sets contained in the rule package, wherein a topmost processor in the tree structure provides results of analysis using fuzzy logic, wherein the relevancy processor arrangement comprises a series of interconnected compute servers comprising aggregator hardware nodes and processor hardware nodes, wherein the series of interconnected compute servers are configured to categorize and scale performance of multiple disjoint algorithms across a seemingly infinite actor population. The series of interconnected compute servers are configured to normalize data using a common taxonomy.

According to a further aspect of the present design, there is provided a system comprising a knowledge base hardware system comprising a rule package comprising a plurality of rule sets configured to receive rules from a rule device and events from an events device and a relevancy processor arrangement comprising a series of processors organized in a tree arrangement and configured to perform functions according to at least one of the plurality of rule sets contained in the rule package using fuzzy logic, wherein the relevancy processor arrangement comprises a series of interconnected compute servers comprising aggregator hardware nodes and processor hardware nodes. The series of interconnected compute servers are configured to categorize and scale performance of multiple disjoint algorithms across a seemingly infinite actor population.

According to a further aspect of the present design, there is provided a system for measuring values qualitatively across a terrain comprising multiple dimensions using cognitive computing techniques, comprising a plurality of event reception components configured to operate on each event in a stream relevant to the terrain, the plurality of event reception components comprising a threshold application component configured to apply a threshold to each element in the stream, a terrain updater configured to update the terrain based on at least one event, an outlier analysis module configured to determine any outlier in the stream of events, a threshold violation predictor configured to predict threshold violations based on the stream of events, a time-ordered behavior evaluator configured to evaluate behavior based on the stream of events, and a graph updater to update a graph based on the stream of events.

According to a further aspect of the present design, there is provided a system for measuring values qualitatively across a terrain comprising multiple dimensions using cognitive computing techniques, comprising a plurality of event reception components configured to operate on each event in a stream relevant to the terrain, a periodic set of components configured to operate periodically on demand to analyze and predict based on information received from the plurality of event reception components, and a plurality of signal managers interfacing with the plurality of event reception components and the periodic set of components, wherein the plurality of signal managers is configured to exclude signals based on content properties of data transmitted.

According to a further aspect of the present design, there is provided a method for measuring values qualitatively across a terrain comprising multiple dimensions using cognitive computing techniques, comprising operating on each event in a stream relevant to the terrain using a plurality of event reception components, operating on demand to analyze and predict based on information received from the plurality of event reception components using a periodic set of components, and excluding selected signals based on content properties of data transmitted.

According to a further aspect of the present design, there is provided a system for detecting and adjusting qualitative contexts across multiple dimensions for multiple actors with cognitive computing techniques comprising a series of periodic execution components configured to operate over full or partial sets of received data, the series of periodic components comprising a peer to peer analyzer configured to detect anomalous behaviors among work-specific peer actors sharing similar types tasks, an actor behavior analyzer configured to examine change in an actor's behavior over time by comparing the similarity of past behavior and current behavior, a rate of change predictor configured to study changes in behavior over time for peer to peer performance according to the peer to peer analyzer, actor behavior change according to the actor behavior analyzer, and actor correlation analysis, and a semantic rule analyzer configured to encode conditional, provisional, cognitive, operational, and functional knowledge, and a plurality of signal managers configured to exclude signals based on content properties of data transmitted.

According to a further aspect of the present design, there is provided a system for detecting and adjusting qualitative contexts across multiple dimensions for multiple actors with cognitive computing techniques comprising a series of periodic execution components configured to operate over full or partial sets of received data, the series of periodic components comprising a peer to peer analyzer configured to detect anomalous behaviors among work-specific peer actors sharing similar types tasks and an actor behavior analyzer configured to examine change in an actor's behavior over time by comparing the similarity of past behavior and current behavior, and a plurality of event reception components configured to operate on each event in a stream relevant to a terrain and selectively provide information to the series of periodic execution components.

According to a further aspect of the present design, there is provided a method for detecting and adjusting qualitative contexts across multiple dimensions for multiple actors with cognitive computing techniques comprising detecting anomalous behaviors among work-specific peer actors sharing similar types tasks using a peer to peer analyzer, examining change in an actor's behavior over time by comparing the similarity of past behavior and current behavior using an actor behavior analyzer, studying changes in behavior over time for peer to peer performance according to the peer to peer analyzer, actor behavior change according to the actor behavior analyzer, and actor correlation analysis using a rate of change predictor; and encoding conditional, provisional, cognitive, operational, and functional knowledge using a semantic rule analyzer.

According to a further aspect of the present design, there is provided a system for defuzzification of multiple qualitative signals into human-centric threat notifications using cognitive computing techniques, comprising a series of periodic execution components configured to operate over full or partial sets of received data, and a plurality of event reception components configured to operate on each event in a stream relevant to a terrain and selectively provide information to the series of periodic execution components. The system detects and signals anomalies upon detecting behavior inconsistent with normal behavior.

According to a further aspect of the present design, there is provided a system comprising a series of periodic execution components configured to operate over full or partial sets of received data, a plurality of event reception components configured to operate on each event in a stream relevant to a terrain and selectively provide information to the series of periodic execution components, and a signal manager configured to manage signals for one of the series of periodic execution components and the plurality of event reception components. The system performs defuzzification of multiple qualitative signals into human-centric threat notifications using cognitive computing techniques by detecting and signaling anomalies upon detecting behavior inconsistent with normal behavior.

According to a further aspect of the present design, there is provided a system, comprising a series of periodic execution components configured to operate over full or partial sets of received data, a plurality of event reception components configured to operate on each event in a stream relevant to a terrain and selectively provide information to the series of periodic execution components, and a threat detector configured to detect threats based on information provided by the series of periodic execution components and the plurality of event reception components. The system performs defuzzification of multiple qualitative signals into human-centric threat notifications using cognitive computing techniques by detecting and signaling anomalies upon detecting behavior inconsistent with normal behavior.

According to a further aspect of the present design, there is provided a system for dispatching cognitive computing across multiple workers, comprising a supervisory node configured to dispatch work to a plurality of compute servers forming interconnected knowledge nodes and a relevancy engine provided in at least one knowledge node. The relevancy engine comprises a rule package and a series of processors organized in a tree arrangement, the series of processors configured to perform functions according to the rule package.

According to a further aspect of the present design, there is provided a system for dispatching cognitive computing across multiple workers, comprising a plurality of compute servers forming interconnected knowledge nodes, wherein one of the interconnected supervisory nodes comprises a supervisory node configured to dispatch work to at least one knowledge node. One knowledge node comprises a relevancy engine comprising a series of processors organized in a tree arrangement, the series of processors configured to perform functions according to a rule set.

According to a further aspect of the present design, there is provided a system for dispatching cognitive computing across multiple workers, comprising a plurality of compute servers configured to form a supervisory node configured to dispatch work and a plurality of interconnected knowledge nodes, with a relevancy engine provided in at least one interconnected knowledge node. The relevancy engine comprises a series of processors organized in a tree arrangement, the series of processors configured to perform functions according to a rule package.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A system for assessing values qualitatively across a terrain comprising multiple dimensions using cognitive computing techniques, comprising:
    a plurality of event reception components configured to operate on each event in a stream relevant to the terrain, the plurality of event reception components comprising:
        a threshold application component configured to apply a threshold to each element in the stream;
        a terrain updater configured to update the terrain based on at least one event;
        an outlier analysis module configured to determine any outlier in the stream of events, wherein the outlier analysis module determines whether at least one outlier in the stream of events represents a beginning of a different data pattern or a change to an existing data pattern;
        a threshold violation predictor configured to predict threshold violations based on the stream of events;
        a time-ordered behavior evaluator configured to evaluate behavior based on the stream of events; and
        a graph updater to update a graph based on the stream of events;
    wherein the system changes a rate of change threshold and an outlier boundary threshold upon the outlier analysis module determining the beginning of the different data pattern or the change to the existing data pattern.

2. The system of claim 1, further comprising an event acquirer configured to acquire an event comprising an associated date and set of data fields, and pass event related data to the plurality of event reception components.

3. The system of claim 2, wherein time-ordered behavior evaluator employs a Markov Graph, to learn a general sequence of events performed by one actor during a time period.

4. The system of claim 1, further comprising a periodic set of components configured to operate periodically on demand, the periodic set of components configured to perform peer to peer analysis, actor correlation analysis, actor behavior analysis, semantic rule analysis, and predict rates of change.

5. The system of claim 4, further comprising a threat detector configured to detect threats.

6. The system of claim 5 wherein the threat detector employs an extreme vigilance application programming interface.

7. The system of claim 4, wherein the periodic set of components comprises a peer to peer analyzer, an actor correlation analyzer, an actor behavior analyzer, a rate of change predictor, and a semantic rule analyzer.

8. The system of claim 7, wherein the actor behavior analyzer is configured to examine any changes in actor behavior over time by comparing similarity of past behavior with current behavior.

9. The system of claim 7, wherein the semantic rule analyzer is configured to encode conditional, provisional, cognitive, operational, and functional knowledge.

10. The system of claim 7, wherein the rate of change predictor is configured to store similarity and correlation results over time and rates of change over time.

11. The system of claim 1, further comprising a signal manager configured to exclude signals based on content properties of data transmitted.

12. The system of claim 1, further comprising an additional signal manager connected to a signal filter configured to receive signal weights from a signal weight repository.

13. A system for measuring values qualitatively across a terrain comprising multiple dimensions using cognitive computing techniques, comprising:
    a plurality of event reception components configured to operate on each event in a stream relevant to the terrain;
    a periodic set of components configured to operate periodically on demand to analyze and predict based on information received from the plurality of event reception components, the periodic set of components comprising an outlier analysis module configured to determine at least one outlier in the stream, wherein the outlier analysis module determines whether at least one outlier in the stream represents a beginning of a different data pattern or a change to an existing data pattern; and
    a plurality of signal managers interfacing with the plurality of event reception components and the periodic set of components, wherein the plurality of signal managers is configured to exclude signals based on content properties of data transmitted;
    wherein the system changes a rate of change threshold and an outlier boundary threshold upon the outlier analysis module determining the beginning of the different data pattern or the change to the existing data pattern.

14. The system of claim 13, wherein the plurality of event reception components comprises:
    a threshold application component configured to apply a threshold to each element in the stream;

a terrain updater configured to update the terrain based on at least one event;

a threshold violation predictor configured to predict threshold violations based on the stream of events;

a time-ordered behavior evaluator configured to evaluate behavior based on the stream of events; and a graph updater to update a graph based on the stream of events.

15. The system of claim 13, further comprising a signal manager configured to exclude signals based on content properties of data transmitted.

16. The system of claim 13, further comprising a threat detector configured to detect threats.

17. A method for measuring values qualitatively across a terrain comprising multiple dimensions using cognitive computing techniques, comprising:

operating on each event in a stream relevant to the terrain using a plurality of event reception components;

operating on demand to analyze and predict based on information received from the plurality of event reception components using a periodic set of components comprising:

determining at least one outlier in the stream; and determining whether the at least one outlier in the stream represents a beginning of a different data pattern or a change to an existing data pattern;

excluding selected signals based on content properties of data transmitted;

changing a rate of change threshold and an outlier boundary threshold upon determining the beginning of the different data pattern or the change to the existing data pattern.

18. The method of claim 17, wherein operating on each event in the stream comprises:

applying a threshold to each element in the stream;

updating the terrain based on at least one event;

predicting threshold violations based on the stream of events;

evaluating behavior based on the stream of events; and updating a graph based on the stream of events.

19. The method of claim 17, further comprising excluding signals based on content properties of data transmitted using a signal manager.

20. The method of claim 17, further comprising detecting threats using a threat detector.

* * * * *